United States Patent
Katayama

(10) Patent No.: US 8,300,025 B2
(45) Date of Patent: *Oct. 30, 2012

(54) HEAD MOUNT DISPLAY

(75) Inventor: Shingo Katayama, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 385 days.

This patent is subject to a terminal disclaimer.

(21) Appl. No.: 12/654,296

(22) Filed: Dec. 16, 2009

(65) Prior Publication Data

US 2010/0156836 A1    Jun. 24, 2010

(30) Foreign Application Priority Data

Dec. 19, 2008   (JP) .................................. 2008-324646

(51) Int. Cl.
*G06F 3/041*   (2006.01)
*G09G 5/00*   (2006.01)

(52) U.S. Cl. .............................. 345/173; 345/8; 345/156

(58) Field of Classification Search ................ 345/8, 81, 345/156, 168, 173; 351/200; 359/630; 382/103; 455/575.2; 463/45; 715/760; 348/77
See application file for complete search history.

(56) References Cited

U.S. PATENT DOCUMENTS

| | | | |
|---|---|---|---|
| 2002/0126026 A1 | 9/2002 | Lee et al. | |
| 2002/0126066 A1* | 9/2002 | Yasukawa et al. | 345/8 |
| 2002/0140667 A1* | 10/2002 | Horiki | 345/156 |
| 2005/0264527 A1* | 12/2005 | Lin | 345/156 |
| 2006/0262055 A1* | 11/2006 | Takahara | 345/81 |
| 2007/0008624 A1* | 1/2007 | Hirayama | 359/630 |

FOREIGN PATENT DOCUMENTS

| | | |
|---|---|---|
| JP | A-7-271504 | 10/1995 |
| JP | A-7-281818 | 10/1995 |
| JP | A-2000-242394 | 9/2000 |
| JP | A-2002-278673 | 9/2002 |
| JP | A-2005-301583 | 10/2005 |

* cited by examiner

*Primary Examiner* — Quan-Zhen Wang
*Assistant Examiner* — Lin Li
(74) *Attorney, Agent, or Firm* — Oliff & Berridge, PLC

(57) ABSTRACT

A HMD photographs at least a portion of a field of view of a user, and detects a hand of the user based on a result of analysis of an imaged image. The HMD performs a control of deciding and displaying a position of an operation part of a virtual operation panel based on a position of the detected hand of the user. A position associated with the hand visible to the user is set as a display position of the virtual operation panel which tracks the position of the hand of the user. The HMD determines whether or not the virtual operation panel is operated based on a contact position of a finger of the user detected by a touch panel, and performs a control corresponding to an operation position of the virtual operation panel when it is determined that the virtual operation panel is operated.

6 Claims, 15 Drawing Sheets

Fig.6

SIZE TABLE

| SIZE OF HAND | A~B | B~C | C~D | D~E |
|---|---|---|---|---|
| K/B SIZE | XL | L | M | S |

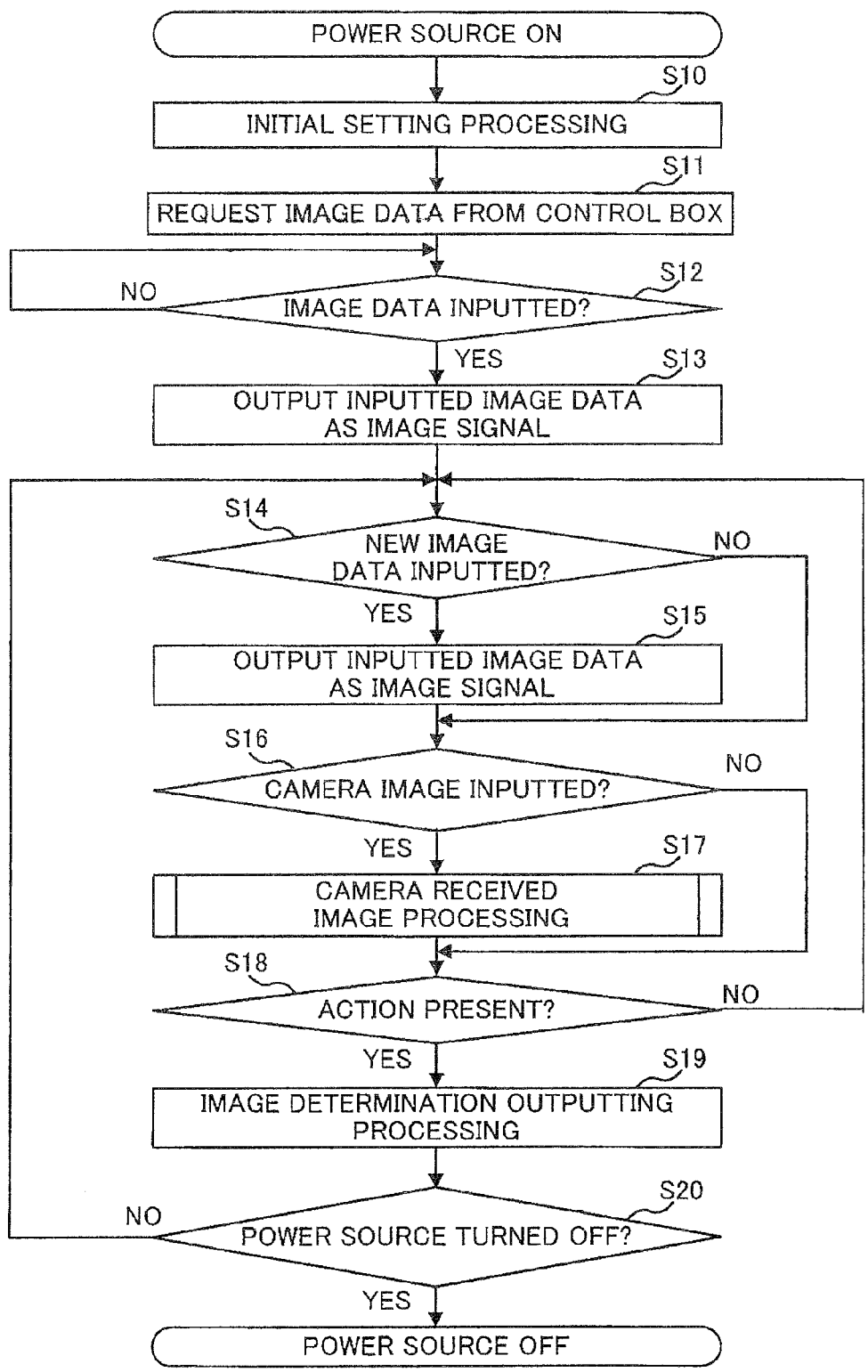

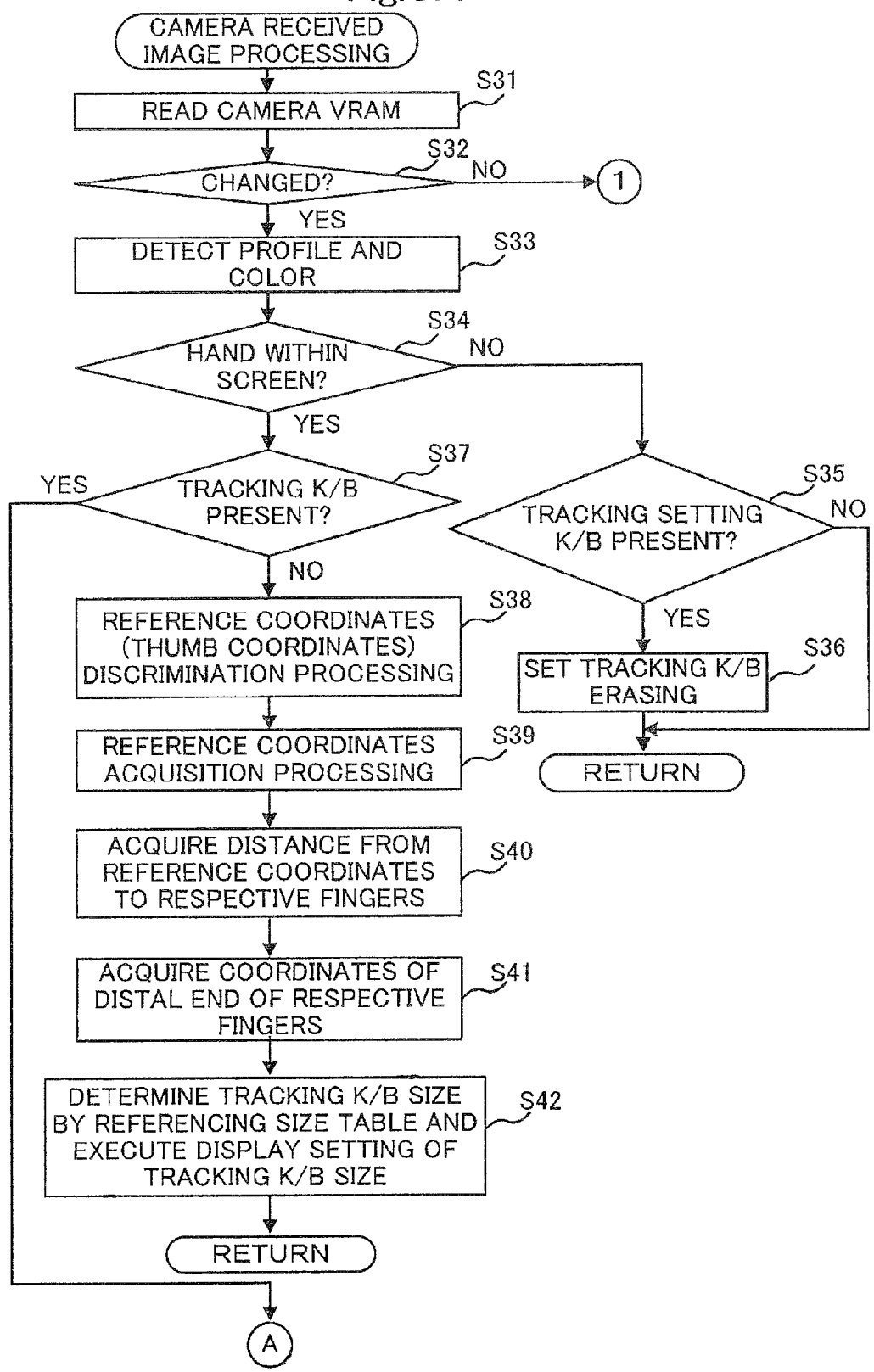

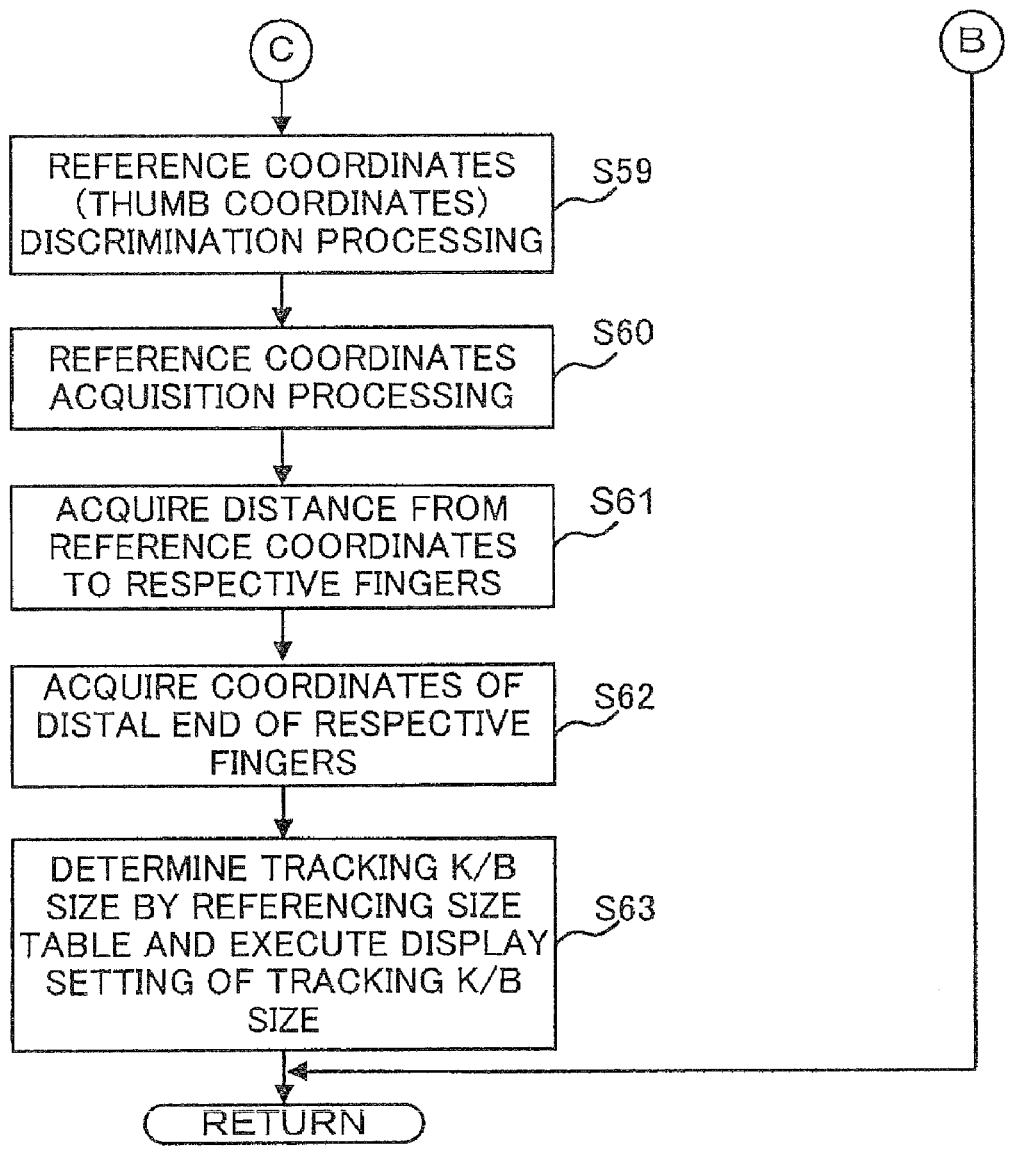

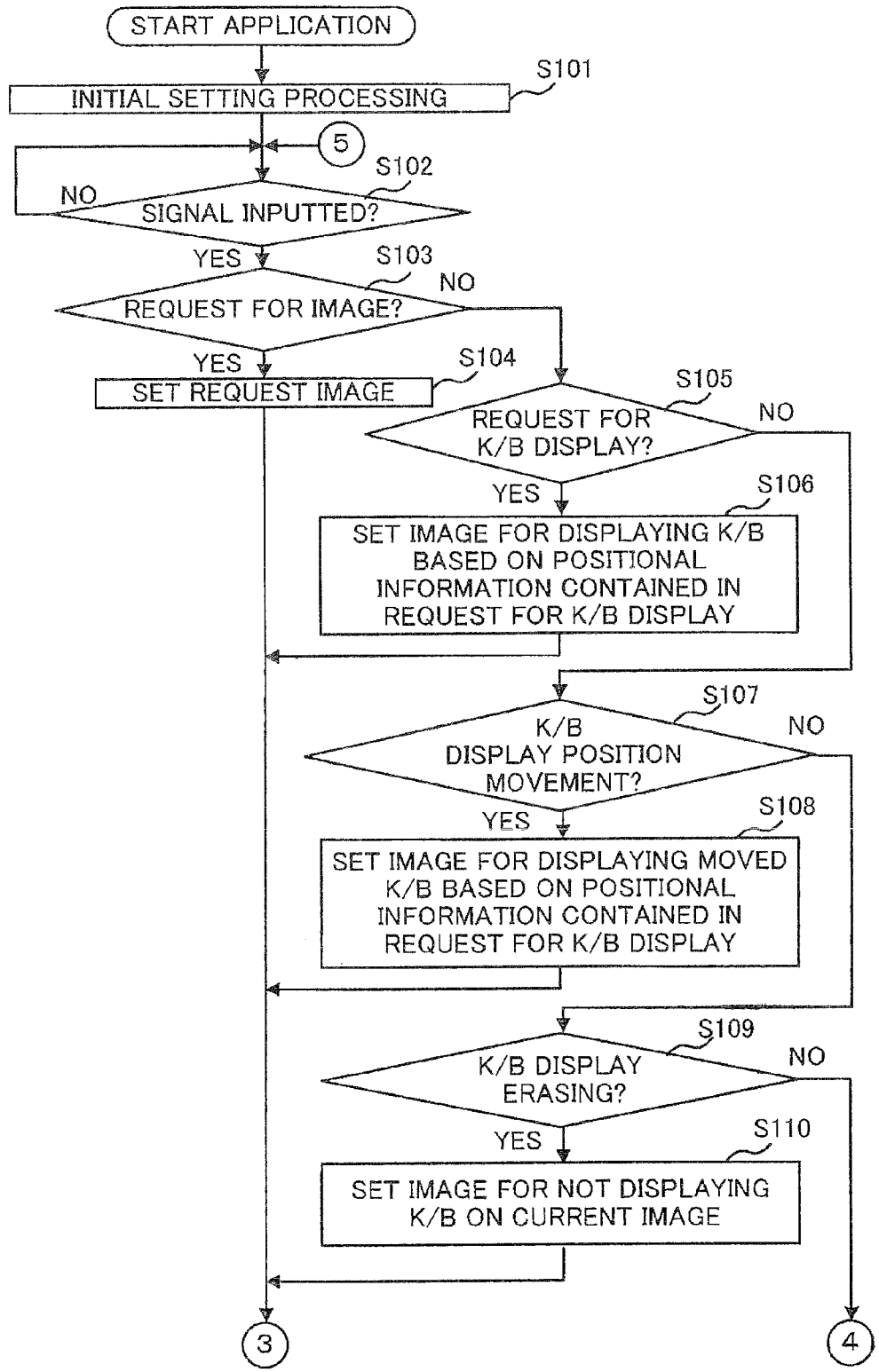

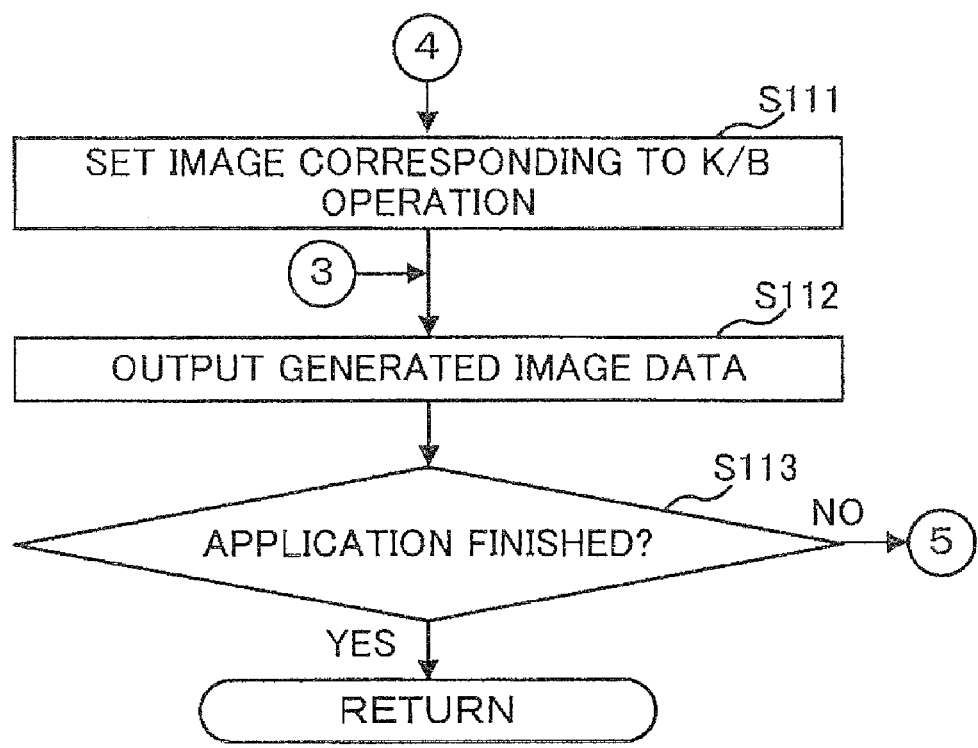

HEAD MOUNT DISPLAY

CROSS-REFERENCE TO RELATED APPLICATIONS

This application is based on and claims the benefit of priority from Japanese Patent Application No. 2008-324646 filed on Dec. 19, 2008, the entire contents of which are incorporated herein by reference.

BACKGROUND

1. Field

The present invention relates to a head mount display. The present invention relates more particularly to a see-through type head mount display provided with a display unit which allows transmission of an ambient light therethrough and projects an image light corresponding to image data to an eye of a user thus allowing the user to observe an image corresponding to the image light.

2. Description of the Related Art

Conventionally, there has been known an information processing device which includes a memory unit for storing various content data such as moving image files, still image files and document files, and a reproducing unit which reproduces the content data stored in the memory unit.

A typical example of such an information processing device is a personal computer. In general, the personal computer is constituted of a computer body provided with a memory unit, a reproducing unit and the like, a mechanical operating unit such as a keyboard or a mouse which a user operates to allow the computer body to perform predetermined operations, a display which displays the content data reproduced by the reproducing unit as an image and the like.

As the display which displays the image data, a display device which is used in a state where the display device is placed on a table such as a CRT (Cathode Ray Tube) display or a liquid crystal display has been known in general. However, there has been also developed a head mount display (also referred to as "HMD" hereinafter) which allows a user to observe an image in a state where the user mounts the HMD on his/her head using a liquid crystal display element or the like as an image display device.

With respect to such an HMD, there has been known a see-through type HMD which also allows the transmission of an ambient light. This see-through type HMD is configured to display content data as an image and allow a user to observe an external field while observing the content data.

With respect to a conventional display, there has been known a display in which a virtual operation panel is displayed in a fixed manner. For example, and an inputting operation corresponding to an operation position on the virtual operation panel is performed by detecting a position or an operation conducted by a finger of a user on the displayed virtual operation panel.

SUMMARY

However, in the conventional technique, the display position of the virtual operation panel for performing predetermined operation inputting is fixed. Accordingly, if this technique is applied to the see-through type HMD, when a user moves his head on which the HMD is put, a position where the virtual operation panel is observed (display position) is also moved. Accordingly, there exists a possibility that the display position of the virtual operation panel and the operation position of the user are displaced from each other. This positional displacement would lead to erroneous inputting.

Usually, the virtual operation panel is constituted of a plurality of virtual keys to which different inputs are allocated, and the plurality of virtual keys is arranged close to each other. Accordingly, even when the user slightly moves his head, the position of the key is moved. Due to such movement of the key, the user would operate an operation key different from a desired operation key thus giving rise to a possibility of frequent occurrence of erroneous inputting. To prevent the occurrence of such erroneous inputting, it may be possible to urge the user to fix his head during an inputting operation using operation keys. However, such an inputting operation would cause the user to experience uncomfortable feelings.

The present invention has been made under such circumstances, and it is an object of the present invention to provide a head mount display which can prevent the displacement between a display position of a virtual operation panel and an operation position of a user.

To achieve the above-mentioned object, according to one aspect of the present invention, there is provided a see-through type head mount display which includes:

a display unit; an imaging unit; an image analyzing unit; a hand detection unit; a touch panel; a position definition unit; a display control unit; an operation determination unit; and an operation control unit.

Here, the display unit is configured to transmit an ambient light therethrough, and is configured to project an image light corresponding to image data onto an eye of a user in order to allow the user to observe an image corresponding to the image light. The imaging unit is configured to image at least a portion of a field of view of the user (or user's view). The image analyzing unit is configured to analyze an image imaged by the imaging unit. The hand detection unit which is configured to detect a hand of the user based on a result of an analysis performed by the image analyzing unit. The touch panel is configured to detect a contact of the hand of the user therewith. The position definition unit is configured to define a display position to display a virtual operation panel such that the virtual operation panel tracks the hand of the user which is observed by the user through the display unit. The display control unit is configured to control the display unit such that the display unit displays the virtual operation panel at the display position. The operation determination unit is configured to determine whether or not the virtual operation panel is operated based on a touch position of a finger of the user detected by the touch panel. The operation control unit is configured to perform a control corresponding to an operation position on the virtual operation panel when the operation determination unit determines that the virtual operation panel is operated.

The position definition unit further defines a first specified portion of the hand of the user as a reference position based on a position of the hand of the user detected by the hand detection unit, and defines a position which always assumes a predetermined positional relationship with the reference position and which is within a display area displayed by the display unit as the display position.

BRIEF DESCRIPTION OF THE DRAWINGS

FIG. 6 is an explanatory view showing a size table in the HMD according to one embodiment of the present invention;

FIG. 8 is a flow chart showing one example of processing which is executed in performing a control of the HMD;

FIG. 9A is a flow chart showing one example of processing which is executed in performing the control of the HMD;

FIG. 10B is a flow chart showing one example of processing which is executed in performing the control of the HMD;

FIG. 12 is a flow chart showing one example of processing which is executed in performing the control of the HMD; and FIG. 13 is a flow chart showing one example of processing which is executed in performing the control of the HMD.

DETAILED DESCRIPTION

A head mount display (also referred to as "HMD" hereinafter) 1 according to one embodiment of the present invention is explained specifically in conjunction with drawings.

[Overall Constitution of HMD]

Figure 1:
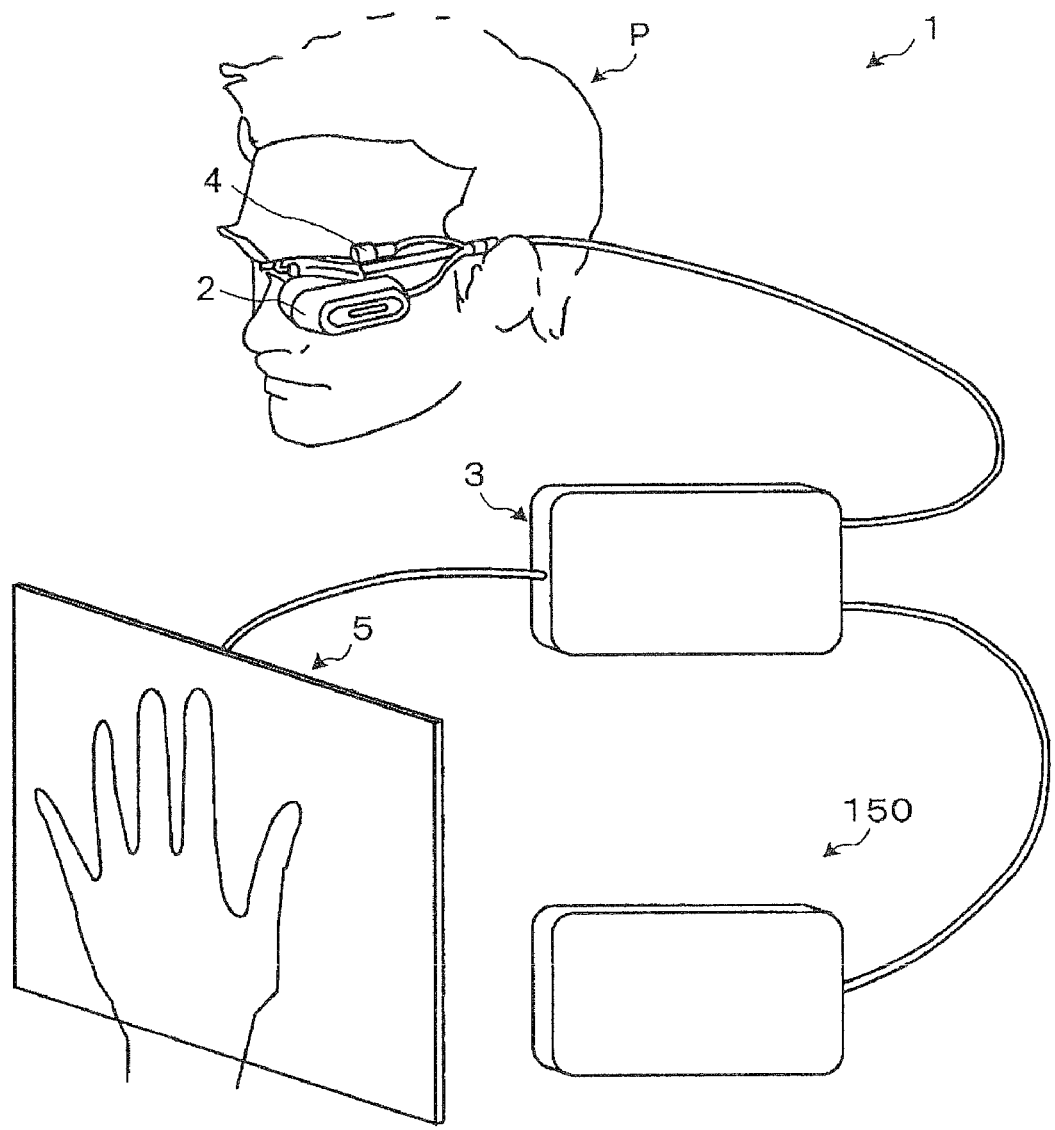
FIG. 1 is an explanatory view showing an HMD according to one embodiment of the present invention.

As shown in FIG. 1, the HMD 1 according to this embodiment includes an HMD body 2 which a user P mounts on his head, a controller 3, a CCD (Charge Coupled Device) camera 4, touch panel 5 which detects a contact of a finger of the user P therewith, and a control box 150 which is communicably connected with the controller 3.

The HMD body 2 performs a display which allows the user P to observe various content data such as moving image files, still image files and document files and a virtual operation panel as images in a state that the user P mounts the HMD body 2 on his head. The HMD body 2 is a retinal scanning display which allows the user P to observe an image corresponding to content data (hereinafter simply referred to as "content") by scanning light whose intensity is modulated corresponding to respective colors (R, G, B) two-dimensionally on a retina of the user P.

In this manner, the retinal scanning display is adopted as the HMD body 2 in the HMD of this embodiment. As another example of the HMD body 2, it may be possible to adopt a display in which light passes through or is reflected on a LCD (liquid crystal display) to form an image light and the image light is projected on an eye Y of the user P thus allowing the user P to observe the content.

The HMD body 2 is configured to, even in the midst of display of the content, allow the user P to observe an external field within a field of view of the user P except for a region where the content is displayed.

Figure 2:
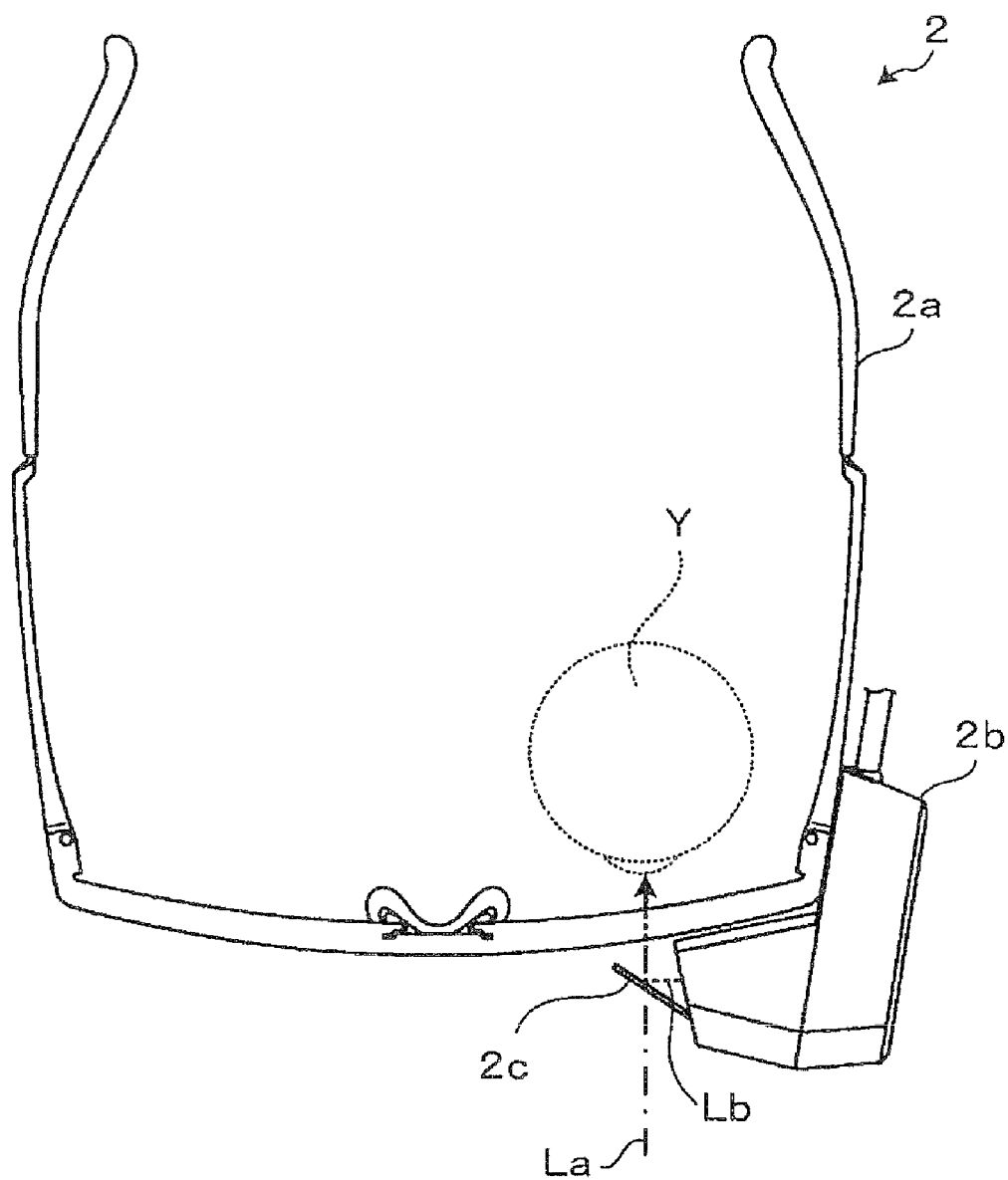
FIG. 2 is a view showing the appearance of an HMD body according to one embodiment of the present invention.

The HMD body 2 includes, as shown in FIG. 2, a support member 2a having an approximately glass shape, and an image forming part 2b which forms an image to be recognized by a user. The image forming part 2b includes a half mirror 2c in front of an eye of the user P. An ambient light La passes through the half mirror 2c and is incident on the eye Y of the user P. An image light Lb corresponding to content data is reflected on the half mirror 2c and is incident on the eye Y of the user P. In this manner, the HMD 1 constitutes a see-through type HMD which projects the image light corresponding to the content data on the eye Y of the user P while allowing the ambient light La to pass therethrough.

The controller 3 mainly performs processing for supplying an image signal to the HMD body 2. The controller 3 is communicably connected with the HMD body 2, the CCD camera 4, the touch panel 5, the control box 150 and the like. A control part 10 which controls the whole HMD 1 (see FIG. 5) and the like are built in the controller 3.

The CCD camera 4 is configured to sample at least a portion of an image in the field of view of the user P. That is, the CCD camera 4 functions as an imaging unit 201 (see FIG. 7) which images at least a display area 6 (see FIG. 3 and FIG. 4) within a field of view of the user P.

Figure 3:
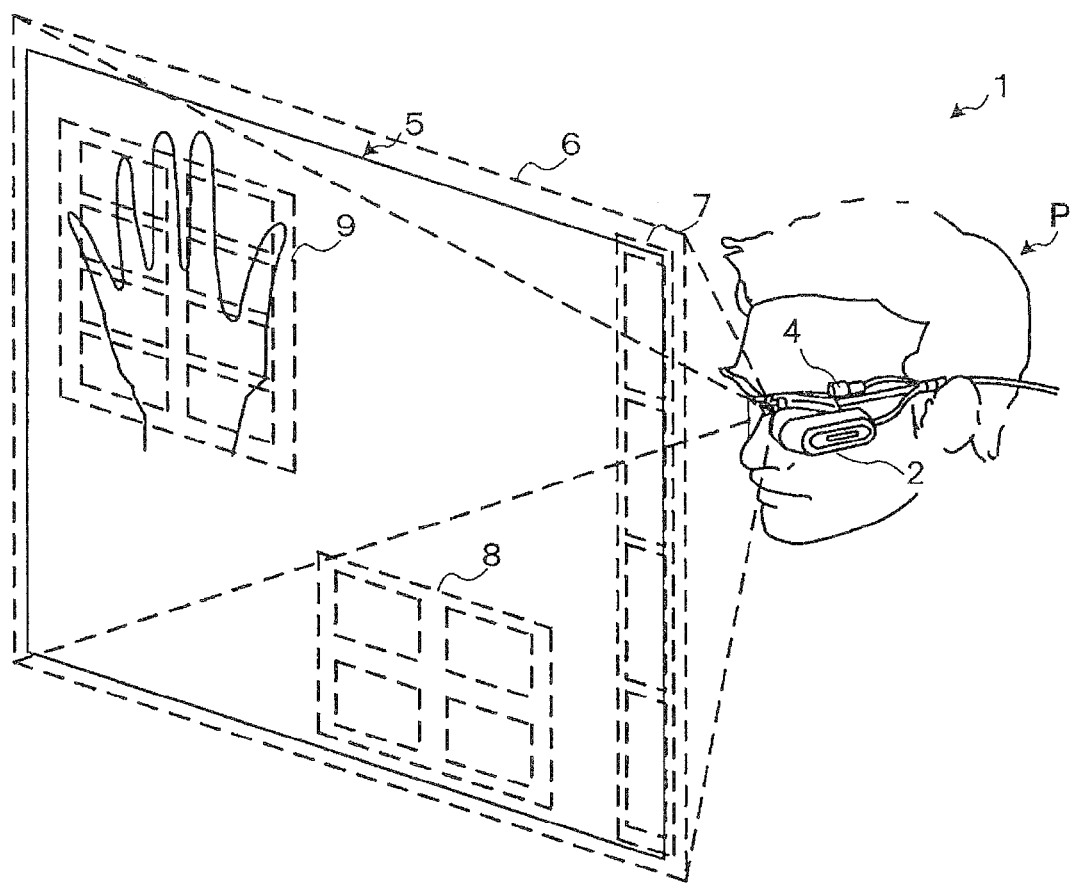
FIG. 3 is an explanatory view showing the HMD according to one embodiment of the present invention.

In the HMD 1 having the above-mentioned constitution, as shown in FIG. 3, the display area 6 is set in at least a portion of the field of view of the user P. The user P can observe an image in the display area 6 within the field of view of the user P. Particularly, virtual operation panels are displayed in the display area 6. The user P can perform operations with respect to these virtual operation panels. Further, the HMD 1 is a see-through type HMD and hence, the user P can observe these virtual operation panels while observing an external field.

In this embodiment, as shown in FIG. 3, the explanation is made with respect to an example which adopts, as the virtual operation panels, a virtual menu bar 7 which is displayed at a fixed position in the display area 6 and tracking virtual keyboards 8, 9 which are movable while tracking a hand of the user P.

The touch panel 5 detects a contact of a finger of the user P or the like therewith. Provided that the touch panel 5 is arranged within the display area 6 of the HMD body 2 (within an imaging region of the CCD camera 4), a contact operation of the touch panel 5 becomes valid.

Further, the user P can operate the touch panel 5 by bringing his hand into contact with the touch panel 5 at two positions. To be more specific, when the hand of the user P touches the touch panel 5 at the reference position (thumb position) as well as at a second position different from the reference position, the controller 3 recognizes an operation corresponding to the second position.

A key operation of the virtual menu bar 7 or the tracking virtual keyboards 8, 9 which is made by the user P is detected based on an image imaged by the CCD camera 4 or contact information from the touch panel 5.

To be more specific, when a hand of the user P enters the display area 6 in the HMD body 2, the controller 3 detects a position of the hand of the user P based on the image imaged by the CCD camera 4. On the other hand, when the hand of the user P touches the touch panel 5 at the reference position (thumb position), the controller 3 analyzes the image imaged by the CCD camera 4 and detects the reference position of the hand of the user P. Further, the controller 3 detects the coordinates of contact position on the touch panel 5. The controller 3 recognizes the positional relationship between the touch panel 5 and the CCD camera 4 corresponding to the detected reference position and the detected coordinates of contact position. That is, the controller 3 recognizes the positional relationship between the touch panel 5 and the display area 6 in the HMD body 2. When the contact of the hand of the user with the touch panel 5 at the second position other than the reference position, the controller 3 recognizes that the virtual operation panel displayed in the display area 6 of the HMD body 2 is operated based on the positional relationship with the reference position on the touch panel 5.

In this manner, based on the image imaged by the CCD camera 4 and the contact information from the touch panel 5, the controller 3 recognizes the position where the touch panel 5 is operated by the finger of the user P and a state where a key of the virtual operation panel disposed at the position is operated by the user P.

[Display Image]

Figure 4:
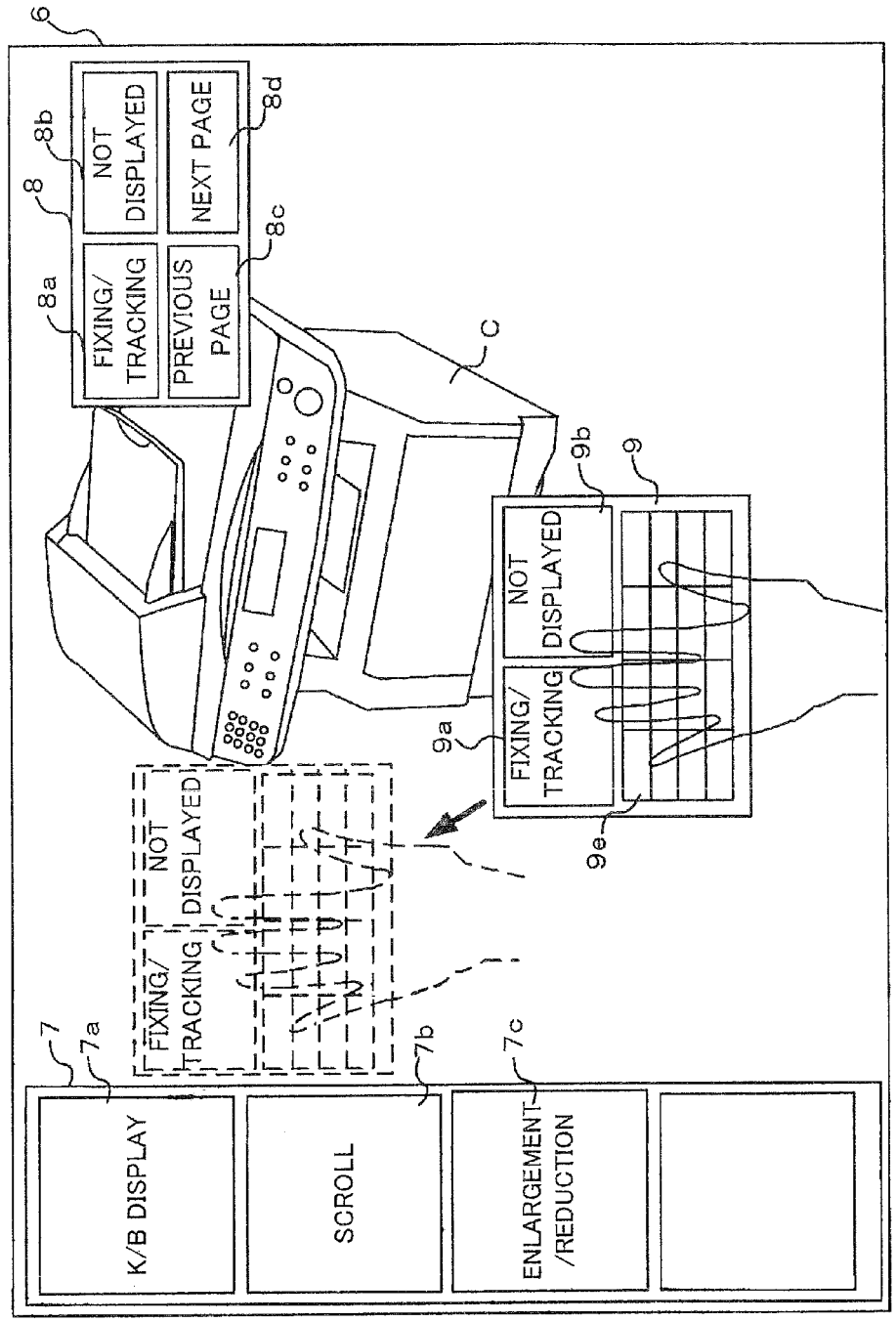
FIG. 4 is an explanatory view showing a display image displayed by the HMD according to one embodiment of the present invention.

Here, the display image displayed by the HMD 1 according to this embodiment is explained in conjunction with FIG. 4.

As shown in FIG. 4, in the inside of the display area 6 of the HMD 1, various kinds of virtual operation panels 7 to 9 are displayed. The display area 6 is set such that the display area 6 is displayed in at least a portion of the field of view of the user P. Further, the HMD 1 is a see-through type HMD and hence, the user P can observe the virtual operation panels 7 to 9 while observing an external field. To be more specific, the user P can observe devices or the like present in the external field.

Various virtual operation panels include the virtual menu bar 7, the tracking virtual keyboards 8, 9 and the like.

A plurality of menu buttons is arranged on the virtual menu bar 7. To be more specific, a keyboard (K/B) display key 7a, a scroll key 7b and an enlargement/reduction key 7c are arranged on the virtual menu bar 7. The K/B display key 7a is a key for displaying the tracking virtual keyboards 8, 9 which track a hand of the user P. The scroll key 7b is a key for displaying a scroll key which tracks the hand of the user P. The enlargement/reduction key 7c is a key for displaying an enlargement/reduction key which tracks the hand of the user P.

The operation of the virtual menu bar 7 by the user P is performed based on an image imaged by the CCD camera 4 and the contact of the hand of the user P with the touch panel 5. That is, the controller 3 analyzes the image imaged by the CCD camera 4 and also detects the contact position of the hand of the user P with the touch panel 5 thus detecting a contact operation conducted by the hand of the user P.

To be more specific, when the hand of the user P enters the display area 6, the controller 3 detects a profile and color of the hand of the user P based on the image imaged by the CCD camera 4 and detects the position of the hand of the user P. In this manner, the controller 3 recognizes the entrance of the hand of the user P in the display area 6 thus realizing the recognition of the positional relationship between the CCD camera 4 and the hand of the user P.

To consider a case where the hand of the user P is detected, when the hand of the user P touches the touch panel 5 at the reference position, the controller 3 detects the coordinates of contact position based on contact information from the touch panel 5. Further, the controller 3 detects the reference position of the hand of the user P based on a result of analysis of the image. Due to such operations, the positional relationship between the touch panel 5 and the CCD camera 4 can be recognized. Still further, as described above, the CCD camera 4 images at least a portion of the display area 6 of the HMD body 2 and hence, the controller 3 recognizes the positional relationship between the touch panel 5 and the display area 6 of the HMD body 2.

When a portion of the hand of the user P, which is different from the reference position of the hand, touches the touch panel 5, the controller 3 can recognize the position where the touch panel 5 is operated based on the positional relationship between the reference position of the hand of the user P and the portion different from the reference position of the hand of the user P.

The tracking virtual keyboard 8 is a scroll keyboard for changing a page of content (for example, document file). The tracking virtual keyboard 8 is movable while tracking the hand of the user P.

The tracking virtual keyboard 8 includes a keyboard (K/B) fixing and tracking (fixing/tracking) key 8a, a keyboard (K/B) non-display key 8b, and an operation inputting keys (previous page key 8c, next page key 8d). The K/B fixing/tracking key 8a is a key for switching a mode in which the tracking virtual keyboard 8 is displayed in a fixed manner without tracking the hand of the user P and a mode in which the tracking virtual keyboard 8 is moved while tracking the hand of the user P. The K/B non-display key 8b is a key for making the tracking virtual keyboard 8 not displayed. The previous page key 8c is a key for changing a screen to be displayed to a previous page. The next page key 8d is a key for changing a screen to be displayed to a next page.

In the same manner as the tracking virtual keyboard 8, the tracking virtual keyboard 9 also includes a K/B fixing/tracking key 9a, a K/B non-display key 9b and the like. The tracking virtual keyboard 9 also includes a numerical keypad 9e and the like as operation inputting keys besides the above-mentioned keys.

When the tracking virtual keyboard 8, 9 is set in a tracking mode due to an operation of the K/B fixing/tracking key 8a, 9a, the tracking virtual keyboard 8, 9 is moved while tracking the hand of the user P. On the other hand, when the tracking virtual keyboard 8, 9 is set in a fixing mode due to an operation of the K/B fixing/tracking key 8a, 9a, the tracking virtual keyboard 8, 9 is not moved even when the hand of the user P is moved. Accordingly, for example, as shown in FIG. 4, when the tracking virtual keyboard 8 is set in a fixing mode and the tracking virtual keyboard 9 is set in a tracking mode, the tracking virtual keyboard 8 set in a fixing mode is not moved while tracking the hand of the user P, while the tracking virtual keyboard 9 set in a tracking mode is moved while tracking the hand of the user P.

By allowing the user to choose not only the tracking mode but also the fixing mode, the user can use a plurality of tracking virtual keyboards 8, 9. However, the number of operation keys which one hand can operate is limited. Particularly, with respect to the tracking virtual keyboard 8, 9, to prevent an erroneous operation due to a detection error of a hand, it is inevitably necessary to make each operation key larger than a finger. In other words, it is impossible to arrange small operation keys in a concentrated manner. To cope with such a situation, the present invention allows the user to use the plurality of tracking virtual keyboards 8, 9 and also allows the user P to select one of these tracking virtual keyboards when necessary and to operate the selected tracking virtual keyboard to track a hand of the user P. Accordingly, the user P can perform a larger number of operations using the tracking virtual keyboards 8, 9.

The tracking processing of the tracking virtual keyboard 8, 9 is performed based on an image imaged by the CCD camera 4 and a contact of the hand of the user P with the touch panel 5. That is, the controller 3 analyzes the image imaged by the CCD camera 4 and also detects a contact position of a hand of the user P on the touch panel 5 thus detecting a hand of the user P to be tracked.

To be more specific, as described above, when the hand of the user P enters the display area 6, the position of the hand of the user P is detected based on the result of analysis of the image imaged by the CCD camera 4. Further, based on the result of analysis of the image, the reference position of the hand of the user P is detected. Then, the display position of the tracking virtual keyboard 8, 9 is defined such that the fixed positional relationship is always established using the reference position as the reference, and the tracking virtual keyboards 8, 9 are displayed at the display position. Accordingly, when the reference position within the imaging region is moved along with the movement of the hand or the head, the display position of the tracking virtual keyboard 8, 9 is also moved while tracking the movement of the reference position.

Further, when the reference position of the hand of the user P touches the touch panel 5 with the tracking virtual keyboard 8, 9 set in a tracking mode, the coordinates of contact position is detected based on the contact information from the touch panel 5 so that the controller 3 can acquire the coordinates of the reference position on the touch panel 5.

Further, when the user newly touches the touch panel 5 at a position different from the reference position of the hand of the user P, the new contact position is detected. Based on the positional relationship among the new contact position, the reference position of the touch panel 5 and the reference position within the display region of the HMD body 2, the operation position of the tracking virtual keyboard 8, 9 corresponding to the coordinates of the new contact position is defined. Then, a control corresponding to the operation position is performed.

In this manner, the controller 3 defines a position which always takes a predetermined positional relationship with the reference position in association with the position of the hand observed by the user P through the half mirror 2c of the HMD body 2 in the display area 6 as a display position of the tracking virtual keyboard 8, 9 which tracks the position of the hand of the user P. Further, the controller 3 supplies pixel signals corresponding to the image data of the tracking virtual keyboards 8, 9 to the HMD body 2. Due to such processing, the tracking virtual keyboard 8, 9 is moved while tracking the hand of the user P. Here, the description "the position associated with the hand observed by the user P" implies a position where the tracking virtual keyboard 8, 9 can be operated by the hand of the user P observed by the user P through the HMD body 2.

In this manner, by moving the tracking virtual keyboard 8, 9 tracking the hand of the user P, even when the hand or the head of the user P is moved, it is possible to prevent the displacement between the display position of the tracking virtual keyboard 8, 9 and the operation position of the user P. That is, even when the user P naturally moves his head or his hand during the operation, the display position of the tracking virtual keyboard 8 tracks the operation position of the hand of the user P and hence, the user P can perform the stable operation inputting.

Further, the controller 3 can fix the position of the tracking virtual keyboard 8, 9 without tracking the position of the hand of the user P based on a predetermined operation. As such a predetermined operation, for example, an operation of the K/B fixing/tracking key 8a, 9a or the like is considered. Accordingly, by fixing the unnecessary tracking virtual keyboard 8, 9 without allowing the tracking virtual keyboard 8, 9 to perform tracking, it is possible to enhance the operability of the HMD 1 thus facilitating the operation of the HMD 1.

Further, the controller 3 makes a decision for setting the display of each tracking virtual keyboards 8, 9 valid or invalid in response to a predetermined operation. As such a predetermined operation, for example, an operation of the K/B display key 7a or the K/B non-display key 8b, 9b is considered. To be more specific, the controller 3 allows a display of the tracking virtual keyboard 8, 9 when the display of the tracking virtual keyboard 8, 9 is set valid due to an operation of the K/B display key 7a by the user P. On the other hand, the controller 3 does not allow a display of the tracking virtual keyboard 8, 9 when the display of the tracking virtual keyboard 8, 9 is set invalid due to an operation of the K/B non-display key 8b, 9b by the user P. Accordingly, by not displaying the unnecessary tracking virtual keyboard 8, 9, the visibility can be enhanced thus facilitating the operation of the HMD 1.

Further, the controller 3 also allows a display of the virtual menu bar 7 for selecting the tracking virtual keyboard 8, 9 which tracks the hand of the user P out of the plurality of tracking virtual keyboard 8, 9. Accordingly, it is possible to provide various kinds of virtual operation panels thus facilitating the operation of the HMD 1.

[Electrical Constitution of HMD]

Figure 5:
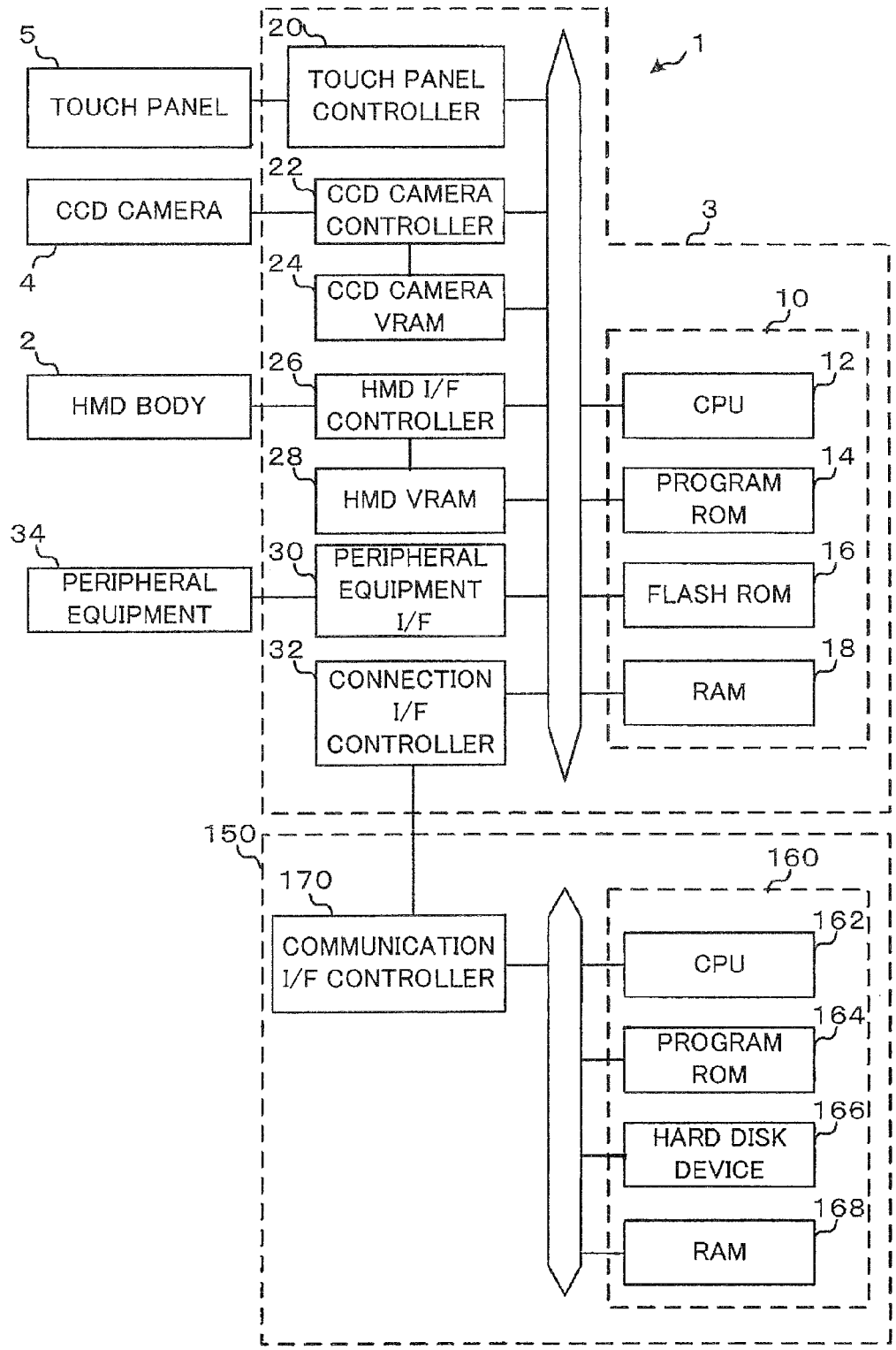
FIG. 5 is an explanatory view showing the electrical constitution of the HMD according to one embodiment of the present invention.

As shown in FIG. 5, the HMD 1 includes the HMD body 2 explained heretofore, the controller 3 which controls the HMD body 2 and the like, the CCD camera 4, the touch panel 5, the peripheral equipment 34, and the control box 150.

The controller 3 includes a control part 10 which systematically controls an operation of the whole HMD 1, a touch panel controller 20, a CCD camera controller 22, a CCD camera VRAM 24, an HMD interface (indicated by "I/F" in the drawings and being also referred to as "I/F" hereinafter) controller 26, an HMD VRAM 28, a peripheral equipment I/F 30, and a connection I/F controller 32.

The control part 10 includes a CPU (Central Processing Unit) 12, a program ROM (Read Only Memory) 14 which is a non-volatile memory, a flash ROM (flash memory) 16, and a RAM (Random Access Memory) 18. These components are connected to a data communication bus respectively, and the transmission and reception of various kinds of information are performed through the data communication bus.

The CPU 12 is an arithmetic processing unit which operates, as the control part 10, various kinds of circuits which constitute the HMD 1 by executing various kinds of information processing program stored in the program ROM 14 so that the CPU 12 executes various functions which the HMD 1 possesses.

The flash ROM 16 stores images which are imaged by the CCD camera 4 in response to a request from the control part 10 and images supplied from other devices such as the control box 150.

The touch panel controller 20 receives a contact signal transmitted from the touch panel 5 based on the control of the control part 10. The touch panel controller 20 supplies contact information based on the contact signal to the control part 10. Accordingly, the control part 10 can recognize an operation conducted by each finger of the user P with respect to the touch panel 5.

The CCD camera controller 22 controls the CCD camera 4. The CCD camera VRAM 24 temporarily stores an image from the CCD camera 4. The control part 10 controls the CCD camera 4 through the CCD camera controller 22 for recognizing a position of a hand or a finger of the user P. The control part 10 acquires image data imaged by the CCD camera 4 from the CCD camera VRAM 24. Although described later in detail, the control part 10 can recognize the hand of the user P by analyzing an image acquired by the CCD camera VRAM 24.

The HMD I/F controller 26 controls the HMD body 2 in response to a request from the control part 10, and supplies an image signal based on image data stored in the HMD VRAM 28 to the HMD body 2 from the control part 10. Due to such an operation, the control part 10 controls the HMD 1 to display an image.

The HMD body 2 generates respective signals (signals of three primary colors consisting of R, G, B) which constitute elements for generating an image based on the image signal when an image signal is inputted from the HMD I/F controller 26. Further, laser beams based on the generated respective signals are radiated and multiplexed, and the multiplexed laser beams are scanned two-dimensionally. The two-dimensionally scanned beams are converted such that the center line of the beams is converged on a pupil of the user P and are projected on a retina of an eye Y of the user P. The general constitution and the general manner of operation of the HMD body 2 are well-known (see JP-A-2007-178941, for example) and hence, the specific explanation of the HMD body 2 is omitted here.

The peripheral equipment I/F 30 is an interface for connecting the peripheral equipment 34 such as a power source switch or lamps (not shown in the drawing) to the controller 3. For example, when the power source switch or the lamps are connected to the peripheral equipment I/F 30, the control part 10 receives operation information transmitted from switches such as the power source switch from the peripheral equipment I/F 30. Further, the control part 10 supplies lighting information on the lamps to the lamps through the peripheral equipment I/F 30.

The connection I/F controller 32 performs a control which allows communication between the controller 3 and the control box 150. The control part 10 requests the control box 150 to supply image data through the connection OF controller 32. The control part 10 supplies the image data supplied from the control box 150 through the connection I/F controller 32 to the HMD body 2. Further, the control part 10 supplies information transmitted from the touch panel 5 or information transmitted from the peripheral equipment 34 to the control box 150 through the connection I/F controller 32.

The control box 150 includes a control part 160 which systematically controls an image display of the HMD 1 mainly and a communication I/F controller 170 which controls the communication with the controller 3 or other devices.

The control part 160 includes a CPU (Central Processing Unit) 162, a program ROM (Read Only Memory) 164 which is a non-volatile memory, a hard disk device (HDD) 166 and an RAM (Random Access Memory) 168. These components are connected to a data communication bus respectively, and the transmission and reception of various kinds of information are performed through the data communication bus.

The CPU 162 is an arithmetic processing unit which operates, as the control part 160, various kinds of circuits which constitute the control box 150 by executing various kinds of information processing program stored in the program ROM 164 so that the CPU 162 executes various functions which the HMD 1 possesses.

[Size Table]

A size table stored in a flash ROM 16 in the HMD 1 having the above-mentioned constitution is explained in conjunction with FIG. 6.

The size table stored in the flash ROM 16 is a table for deciding sizes of the tracking virtual keyboards 8, 9. In the size table, as shown in FIG. 6, a size of a hand of the user P in appearance and a display size of the tracking virtual keyboard 8, 9 are associated with each other.

For example, when the size of a hand of the user P in appearance is not less than B (pixels) and less than A (pixels), the display size of the tracking virtual keyboard 8, 9 is set to an XL size. When the size of the hand of the user P in appearance is not less than D (pixels) and less than C (pixels), the display size of the tracking virtual keyboard 8, 9 is set to an M size. Here, the size of the hand of the user P in appearance is decided based on distances from a thumb of the user P to respective fingers of the user P.

By allowing the HMD 1 to reference such a size table, the HMD 1 can select the tracking virtual keyboard 8, 9 which corresponds to the size of the hand of the user P in appearance. Accordingly, the operability of the tracking virtual keyboard 8, 9 by the user P can be enhanced and the operation of the tracking virtual keyboard 8, 9 can be facilitated.

[Functional Constitution of HMD]

Figure 7:
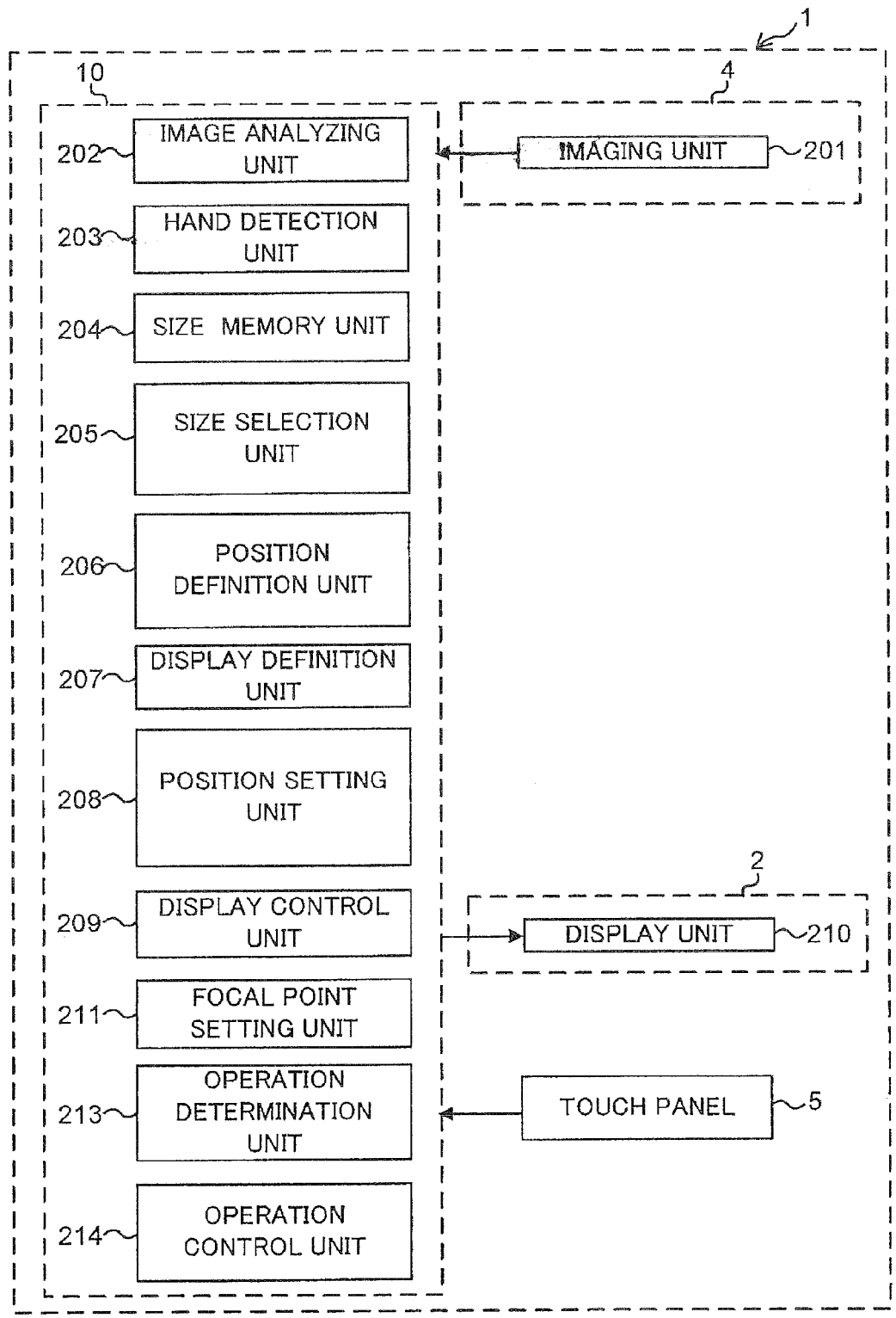
FIG. 7 is an explanatory view showing the functional constitution of the HMD according to one embodiment of the present invention.

Here, the functional constitution or the like of the HMD 1 according to this embodiment is explained in conjunction with FIG. 7.

As shown in FIG. 7, the CCD camera 4 of the HMD 1 functions as an imaging unit 201 which images a field of view of the user P, generates image data, and supplies the image data to the control part 10.

Further, the HMD body 2 of the HMD 1 functions as a display unit 210. The display unit 210 allows transmission of an ambient light La therethrough and projects an image light corresponding to image data to an eye Y of a user P thus allowing the user P to observe an image corresponding to the image light.

The control part 10 of the HMD 1 functions as the following respective units by allowing the CPU 12 to execute a predetermined information processing program. That is, the control part 10 functions as an image analyzing unit 202, a hand detection unit 203, a size selection unit 205, a position definition unit 206 and a display definition unit 207. Further, the control part 10 also functions as a position setting unit 208, a display control unit 209, a focal point setting unit 211, an operation determination unit 213 and an operation control unit 214.

The image analyzing unit 202 analyzes image data imaged by the imaging unit 201. Particularly, the image analyzing unit 202 analyzes image data outputted from the imaging unit 201, and executes the detection of a profile and color of the image imaged by the imaging unit 201.

The hand detection unit 203 detects a hand of the user P based on a result of an analysis performed by the image analyzing unit 202. Particularly, the hand detection unit 203 detects a size of the hand of the user P in addition to a position of the hand of the user P.

The flash ROM 16 functions as a size memory unit 204. In the size memory unit 204, a size of a hand of the user P and a size table (see FIG. 6) which is size information where a size of the tracking virtual keyboard 8, 9 is associated with the size of a hand of the user P are stored.

The size selection unit 205 selects a size of the tracking virtual keyboard 8, 9 which corresponds to the size of the hand of the user P based on the size of the hand of the user P detected by the hand detection unit 203 and the size information stored in the size memory unit 204.

The position definition unit 206 defines a display position of the tracking virtual keyboard 8, 9 which tracks a position of the hand of the user P based on a position of the hand of the user P detected by the hand detection unit 203. The display position defined in this manner is a position which is associated with a hand visible to the user P through the display unit 210 in a see-through manner out of the display area by the display unit 210. That is, the position definition unit 206 defines the position where the tracking virtual keyboard 8, 9 which is visible to the user P can be operated by the hand of the user P visible to the user P by way of the HMD body 2 as the display position of the tracking virtual keyboard 8, 9.

Particularly, the size of the tracking virtual keyboard 8, 9 which the user P can operate easily differs corresponding to the size of the hand of the user P. That is, it is also necessary to properly arrange the display position of the tracking virtual keyboard 8, 9 corresponding to the size of the hand of the user P. Accordingly, the position definition unit 206 defines the display position of the tracking virtual keyboard 8, 9 based on the size of the tracking virtual keyboard 8, 9 selected by the size selection unit 205.

Further, the position definition unit 206 fixes, in response to a predetermined operation, the position of the tracking virtual keyboard 8, 9 without allowing the tracking virtual keyboard 8, 9 to track the position of the hand of the user P. For example, assume a case where the tracking virtual keyboard 8, 9 is fixed and set due to an operation of the K/B fixing/tracking key 8a, 9a by the user P. In this case, the position definition unit 206 does not request the image data where the position of the tracking virtual keyboard 8, 9 is changed from the control box 150.

Further, assume a case where a plurality of virtual operation panels (containing the virtual menu bar 7, the tracking virtual keyboards 8, 9 and the like, for example) is set at a position in an overlapping manner. In this case, the position definition unit 206 makes the tracking movement decision which allows, by priority, the tracking virtual keyboard which is selected for tracking the position of the hand of the user P latest out of the plurality of overlapping tracking virtual keyboards 8, 9 to track.

The display definition unit 207 makes a definition for setting the display of the tracking virtual keyboard 8, 9 valid or invalid in response to a predetermined operation. As the predetermined operation, for example, an operation of the K/B display key 7a or the K/B non-display key 8b, 9b by the user P is named. Here, setting the display of the tracking virtual keyboard 8, 9 valid is to display the tracking virtual keyboard 8, 9 in the display area 6. On the other hand, setting the display of the tracking virtual keyboard 8, 9 invalid is not to display the tracking virtual keyboard 8, 9 in the display area 6.

The position setting unit 208 sets the virtual menu bar 7 for selecting the tracking virtual keyboard 8, 9 which is set to track the hand of the user P (selection-use virtual operation panel) from the plurality of virtual operation panels in a predetermined display position (for example, a left side) in the display area 6.

The display control unit 209 controls the display unit 210 to display the virtual operation panel (the virtual menu bar 7 or the tracking virtual keyboard 8, 9) at the display position defined by the position definition unit 206. Further, the display control unit 209 controls the display unit 210 to display the tracking virtual keyboard 8, 9 which is set valid by the display definition unit 207. On the other hand, the display control unit 209 controls the display unit 210 not to display the tracking virtual keyboard 8, 9 which is set invalid by the display definition unit 207.

The focal point setting unit 211, when the tracking virtual keyboard 8, 9 is set valid by the display definition unit 207, sets a focal length of the imaging unit 201 to a specified focal length. Here, the specified focal length is preliminarily stored in the flash ROM 16 as a standard distance at which the hand of the user P is present. However, the specified focal length can be also set in accordance with an operation by the user P.

The operation determination unit 213 determines whether or not the virtual operation panel is operated based on a contact position of a finger of the user P detected by the touch panel 5.

That is, the operation determination unit 213 determines the position coordinates which the user P operates based on a contact signal outputted from the touch panel 5. Further, the operation determination unit 213 determines whether or not the virtual operation panel is operated based on whether or not the position coordinates which the user P operates agree with coordinates of the key on the virtual operation panel (the virtual menu bar 7 or the tracking virtual keyboard 8, 9). Here, the operation determination unit 213 can determine relative coordinates with respect to the reference position or position coordinates which is operated using the reference position as an origin. For example, when the position coordinates which the user P operates agree with coordinates of the K/B non-display key 8b, 9b on the tracking virtual keyboard 8, 9, the operation determination unit 213 determines that the K/B non-display key 8b is operated.

The operation control unit 214, when it is determined by the operation determination unit 213 that the virtual operation panel is operated, performs a control corresponding to an operation position of the virtual operation panel.

For example, the operation control unit 214, when the display key 7a of the virtual menu bar 7 is operated, performs a control of displaying the tracking virtual keyboard 8, 9 in the display area 6. Further, the operation control unit 214, when the non-display key 8b, 9b of the tracking virtual keyboard 8, 9 is operated, performs a control of erasing the tracking virtual keyboard 8, 9 from the display area 6. Still further, the operation control unit 214, when the tracking virtual keyboard 8, 9 is set in a tracking mode, performs a control of moving the tracking virtual keyboard 8, 9 set in a tracking mode within the display area 6 corresponding to the position of the hand of the user P.

In this embodiment, the display, the movement or the erasing of the tracking virtual keyboard 8, 9 is performed in accordance with a request to the control box 150 for such display, the movement or erasing. That is, the operation control unit 214 requests the control box 150 for image data for displaying the tracking virtual keyboard 8, 9, image data for moving the display position of the tracking virtual keyboard 8, 9 or the image data for erasing the tracking virtual keyboard 8, 9. The operation control unit 214 displays the image data acquired from the control box 150 on the HMD body 2 in response to such a request. In displaying or moving the tracking virtual keyboard 8, 9, the control box 150 transmits image data formed by synthesizing the image which displays or moves the tracking virtual keyboard 8, 9 and an image of content to the controller 3. The image of the tracking virtual keyboard 8, 9 may be synthesized with an image acquired from the control box 150 inside the controller 3.

[Control Operation]

Next, the manner of operation of the HMD 1 is explained in conjunction with flow charts shown in FIG. 8 to FIG. 13. Main processing shown in FIG. 8 is executed by the control part 10 in the controller 3 when the power source of the HMD 1 is turned on. Due to such execution of the main processing, the control part 10 of the controller 3 functions as the above-mentioned respective units. Further, main processing shown in FIG. 12 is executed by a control part 160 after a predetermined application starting operation is performed by the control box 150. Due to such execution of the main processing, the control part 160 of the control box 150 functions as the above-mentioned respective units. In the explanation made hereinafter, the explanation is made by mainly focusing on the tracking virtual keyboard 8 as a representative of the tracking virtual keyboards 8, 9.

[Main Processing]

Firstly, as shown in FIG. 8, when electricity is supplied to the HMD 1, the control part 10 performs initial setting (step S10). In this processing, the control part 10 executes initial setting such as RAM access permission and initializing of a working area. When this processing is finished, the control part 10 advances the processing to step S11.

In step S11, the control part 10 requests image data from the control box 150. Then, in step S12, the control part 10 determines whether or not image data is inputted from the control box 150.

When the control part 10 determines that image data is inputted from the control box 150 (step S12: YES), the control part 10 advances the processing to step S13.

On the other hand, when the control part 10 determines that the image data is not inputted from the control box 150 (step S12: NO), the control part 10 returns the processing to step S12. That is, the processing in step S12 is repeated until image data is inputted.

In step S13, the control part 10 outputs the image data inputted from the control box 150 to the HMD body 2 as an image signal. The image data inputted from the control box 150 is image data which contains an image on a first page of an initialized content and an image on the virtual menu bar 7. Due to such processing, the HMD body 2 displays the image which contains the image on the first page and the image on the virtual menu bar 7 such that the image is visible to a user P. When this processing is finished, the control part 10 advances the processing to step S14. In this embodiment, the control part 10 which executes such processing functions as the position setting unit 208, and the display control unit 209.

In step S14, the control part 10 determines whether or not new image data is inputted from the control box 150.

When the control part 10 determines that the new image data is inputted from the control box 150 (step S14: YES), the control part 10 outputs the image data inputted from the control box 150 to the HMD body 2 as an image signal (step S15), and advances the processing to step S16.

On the other hand, when the control part 10 determines that the new image data is not inputted from the control box 150 (step S14: NO), the control part 10 advances the processing to step S16 without executing the processing in step S15.

In step S16, the control part 10 determines whether or not a camera image is inputted. In this processing, the control part 10 reads out image data from the CCD camera VRAM 24 in which image data from the CCD camera 4 is stored, and determines whether or not the camera image is inputted based on whether or not the image data is updated.

When the control part 10 determines that the camera image is inputted (step S16: YES), the control part 10 executes camera received image processing in which an analysis based on the image inputted from the CCD camera 4, a control based on a result of the analysis and the like are performed (step S17) and, thereafter, the control part 10 advances the processing to step S18.

On the other hand, when the control part 10 determines that camera image is not inputted (step S16: NO), the control part 10 advances the processing to step S18 without executing the processing in step S17.

In step S18, the control part 10 determines whether or not actions such as a display, movement, an operation, erasing of the tracking virtual keyboard 8 are made by the user P. For example, when display setting of the tracking virtual keyboard 8 is performed in step S42 or in step S63, the control part 10 determines that the action "display" is made. Further, when movement setting of the tracking virtual keyboard 8 is made in step S46 or step S63, the control part 10 determines that the action "movement" is made. Further, when setting of key inputting/outputting is set in step S64, the control part 10 determines that the action "operation" is made. Further, when erasing of the tracking virtual keyboard 8 is set in step S36, the control part 10 determines that the action "erasing" is made. Further, when output setting of the operation inputting key is performed in step S64 or in step S72, the control part 10 determines that "operation of the operation inputting key" is made.

When the control part 10 determines that the action is made (step S18: YES), the control part 10 advances the processing to step S19. On the other hand, when the control part 10 determines that the action is not made (step S18: NO), the control part 10 returns the processing to step S14.

In step S19, the control part 10 executes image determination outputting processing. In this processing, the control part 10 outputs the image determination indicative of contents of actions such as display, movement, operation, erasing and fixing of the tracking virtual keyboard 8 to the control box 150. In this image determination, the display of the tracking virtual keyboard 8 is outputted to the control box 150 as the K/B display request, and the movement of the tracking virtual keyboard 8 is outputted to the control box 150 as the K/B display position movement request. Further, erasing of the tracking virtual keyboard 8 is outputted to the control box 150 as the K/B display erasing request, and the operation of the tracking virtual keyboard 8 is outputted to the control box 150 as keyboard operation information. When such processing is finished, the control part 10 advances the processing to step S20.

In step S20, the control part 10 determines whether or not the power source is turned off. In this processing, the control part 10 determines whether or not the power source is turned off in response to an operation of the power source switch or the like. When the control part 10 determines that the power source is turned off (step S20: YES), the main processing is finished. On the other hand, when the control part 10 determines that the power source is not turned off (step S20: NO), the control part 10 returns the processing to step S14. Due to such operation, the control part 10 repeatedly executes processing ranging from step S14 to step S20 until the power source is turned off.

[Camera Received Image Processing]

A subroutine executed in step S17 in FIG. 8 is explained in conjunction with FIG. 9A to FIG. 11.

Firstly, as shown in FIG. 9A, the control part 10 reads out image data from the CCD camera VRAM 24 (step S31). Then, the control part 10 compares whether or not the image data is the same as the previous image data, and determines whether or not the image data is changed based on such a comparison (step S32). In this processing, when the control part 10 determines that the image data is changed (step S32: YES), the control part 10 advances the processing to step S33. On the other hand, when the control part 10 determines that the image data is not changed (step S32: NO), the control part 10 advances the processing to step S51 shown in FIG. 10A.

In step S33, the control part 10 executes the detection of a profile and color of the changed image data. That is, the control part 10 analyzes the image in an imaging region of the CCD camera 4.

Then, the control part 10 executes processing for detecting a profile of a hand of the user P based on a result of the profile detection and the color detection. For example, the control part 10 extracts only a skin-color portion, and executes image processing based on a shape of the extracted skin-color portion so as to detect the profile of the hand of the user P.

Next, the control part 10 determines whether or not the hand of the user P is present within a screen (step S34). For example, the control part 10 can determine that the hand of the user P is present within the display area 6 based on the size and the shape of the profile of the hand of the user P. That is, the control part 10 determines whether or not the detected profile is of a size within a predetermined range. The control part 10 determines whether or not the detected profile is analogous to the shape of a hand. For example, there exists the high correlation between the shape of the profile and a predetermined shape, or an upper portion of the shape of the profile is branched into a plurality of portions with respect to the lower portion. As the predetermined shape, a typical shape of a hand is preliminarily registered. In this processing, when the control part 10 determines that the hand of the user P is present within the display area 6 (step S34: YES), the control part 10 advances the processing to step S37. On the other hand, when the control part 10 determines that the hand of the user P is not present within the display area 6 (step S34: NO), the control part 10 advances the processing to step S35.

In step S35, the control part 10 determines whether or not the tracking virtual keyboard 8 which is set in a tracking mode is present within the display area 6 of the HMD body 2. In such processing, when the control part 10 determines that the tracking virtual keyboard 8 which is set in a tracking mode is present within the display area 6 of the HMD body 2 (step S35: YES), the hand of the user P is not present within an imaging range and the tracking virtual keyboard 8 which is set in a tracking mode is displayed and hence, the tracking keyboard is erased (step S36), and the control part 10 finishes this subroutine.

On the other hand, when the control part 10 determines that the tracking virtual keyboard 8 which is set in a tracking mode is not present within the display area 6 of the HMD body 2 (step S35: NO), the hand of the user P is not present within the imaging range and the tracking virtual keyboard 8 which is set in a tracking mode is not displayed and hence, the control part 10 finishes this subroutine without executing the processing in step S36.

In this manner, when the hand of the user P is not present within the imaging range of the CCD camera 4, the control part 10 erases the tracking virtual keyboard 8.

On the other hand, in step S37, the control part 10 determines whether or not the tracking virtual keyboard 8 is present within the display area 6 of the HMD body 2. In this processing, irrespective of whether the tracking virtual keyboard 8 is set in a fixing mode or in a tracking mode, it is determined whether or not the tracking virtual keyboard 8 is present within the display area 6 of the HMD body 2.

In this processing, when the control part 10 determines that the tracking virtual keyboard 8 is present within the display area 6 of the HMD body 2 (step S37: YES), the control part 10 advances the processing to step S43. On the other hand, when the control part 10 determines that the tracking virtual keyboard 8 is not present within the display area 6 of the HMD body 2 (step S37: NO), the control part 10 advances the processing to step S38.

In step S38, the control part 10 executes reference coordinates determination processing. In this processing, the control part 10 determines a position of a thumb of a hand of the user P as reference coordinates based on a result of the analysis of the image data outputted from the CCD camera 4. The control part 10 acquires the determined reference coordinates (thumb position) of the user P (step S39). For example, the control part 10 determines, in an upper portion of a profile of the detected hand of the user P, one of five branched portions which is below four other branched portions and is arranged on either a left side or a right side as a thumb. Then, the control part 10 acquires coordinates of a distal end of the thumb position as reference coordinates. By setting the thumb position as the reference coordinates in this manner, the thumb is fixed to the touch panel 5 while being in contact with the touch panel 5. Accordingly, even when the user P moves his other fingers for performing a key operation, the display position of the virtual panel does not track the movement of the other fingers so that the user P can perform a stable and reliable operation. In this manner, according to this embodiment, the control part 10, based on the result of the analysis of the imaged image, detects the hand of the user P and decides the thumb of the user P as the reference position for tracking. Here, whether the thumb is on a left side or on a right side is also detected, the key is displayed on a side where other fingers are present. Another finger such as a little finger may be used as the reference coordinates.

Next, the control part 10 acquires distances from the reference coordinates to respective fingers (step S40), and the control part 10 also acquires distal-end coordinates of the respective fingers (step S41). That is, the control part 10 determines respective distal ends of branched portions of an upper portion of the detected profile as distal ends of the respective fingers. The control part 10 can acquire distances from the reference coordinates and coordinates with respect to the reference coordinates. Accordingly, based on the result of the analysis of the image data outputted from the CCD camera 4, the control part 10 detects the hand of the user P, and detects a size of the hand of the user P in addition to the position of the hand of the user P. For example, the control part 10 may set the largest distance out of distances from the reference coordinates to the respective fingers as a size of the hand of the user P in appearance. Further, the control part 10 also may set a distance between the remotest two coordinates from the coordinates of the finger tip other than the finger tip of the thumb as a size of the hand of the user P in appearance. Here, the control part 10 can also detect a distance to the nearest finger and hence, the tracking virtual keyboard 8 having a size corresponding to the size of the hand of the user P in appearance may be displayed at a position separated from the reference position by such a distance.

Next, the control part 10 references a size table (see FIG. 6), and decides the size of the tracking virtual keyboard 8 based on the size of the hand of the user P. Then, the control part 10 executes display setting of the tracking virtual keyboard 8 which tracks the hand of the user P (step S42). As shown in FIG. 4, the control part 10, for example, by setting a position of the thumb of the user P as the reference position, displays the tracking virtual keyboard 8 in a region which falls within a range from the finger tip remotest from the wrist to the wrist and is disposed above a horizontal line which passes the distal end of the thumb, that is, in a region where fingers are present, within a profile of the hand of the user P. Further, the control part 10 may display the tracking virtual keyboard 8 on an upper side of proximal ends of four fingers, that is, the proximal end portions where the profile of the hand of the user P is branched.

Then, the control part 10, as the result of display setting, outputs the K/B display request to the control box 150 in the above-mentioned step S19. The K/B display request contains the size of the tracking virtual keyboard 8, position coordinates of the tracking virtual keyboard 8 corresponding to the position of the thumb of the user P and the like. Due to such outputting of the K/B display request, in the control box 150, image data for displaying the tracking virtual keyboard 8 is generated and is outputted to the controller 3.

That is, the control part 10, based on the size of the hand of the user P detected in step S41 and the size table stored in the flash ROM 16, selects a size of the tracking virtual keyboard 8 corresponding to the size of the hand of the user P.

Further, the control part 10 displays the tracking virtual keyboard 8 which is set in a tracking mode at an uppermost layer thus detecting an operation by priority. That is, when a plurality of virtual operation panels (virtual menu bar 7 and tracking virtual keyboards 8, 9) is set at a position in an overlapping manner, the control part 10 sets the latest selected tracking virtual keyboard which tracks the position of the hand of the user P by priority out of the plurality of these overlapping virtual operation panels. When this processing is finished, the control part 10 finishes this subroutine.

Figure 9B:
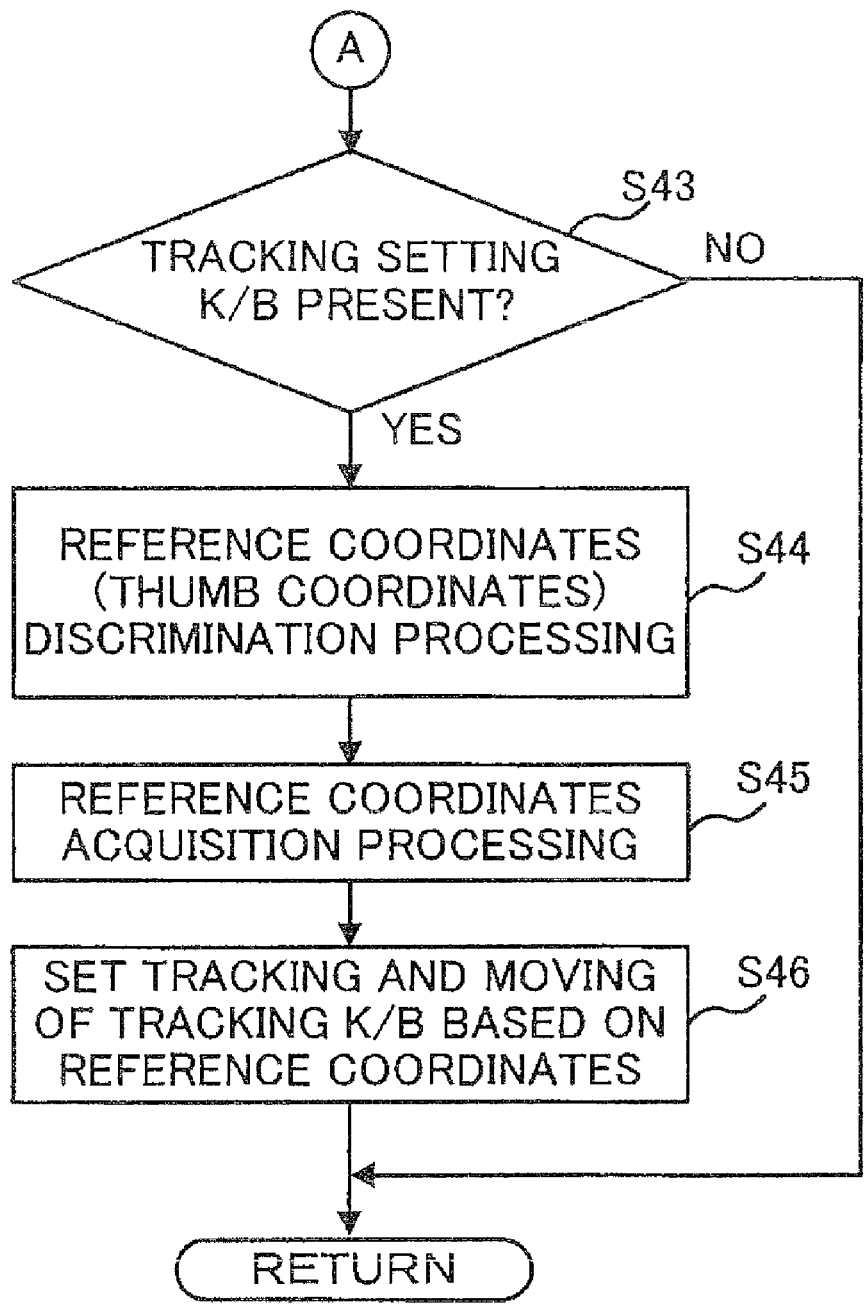
FIG. 9B is a flow chart showing one example of processing which is executed in performing the control of the HMD.

On the other hand, in step S43, as shown in FIG. 9B, the control part 10 determines whether or not the tracking virtual keyboard 8 set in a tracking mode is present. When the control part 10 determines that the tracking virtual keyboard 8 set in a tracking mode is present in this processing (step S43: YES), the control part 10 advances the processing to step S44. On the other hand, when the control part 10 determines that the tracking virtual keyboard 8 set in a tracking mode is not present (step S43: NO), the control part 10 finishes this subroutine without executing the processing ranging from step S44 to step S46.

In step S44, the control part 10 determines a position of a thumb of a hand of the user P as reference coordinates based on the result of the analysis of the image data outputted from the CCD camera 4. The control part 10 acquires the determined reference coordinates (thumb position) of the user P (step S45). In this manner, the control part 10 detects the hand of the user P based on the result of the analysis of the image data outputted from the CCD camera 4 thus detecting the position of the hand of the user P.

Then, the control part 10 performs setting of tracking movement of the tracking virtual keyboard 8 based on the reference coordinates (step S46). The control part 10, as a result of the tracking movement setting, in the above-mentioned step S19, outputs the K/B display position movement request to the control box 150. This K/B display position movement request contains the position coordinates of the tracking virtual keyboard 8 corresponding to the position of the thumb of the user P and the like. Accordingly, image data which allows the tracking virtual keyboard 8 to track the hand of the user P and to be displayed is generated in the control box 150, and is outputted to the controller 3.

Further, the control part 10 displays the tracking virtual keyboard 8 set in a tracking mode at an uppermost layer thus detecting an operation by priority. That is, when a plurality of virtual operation panels (virtual menu bar 7 and tracking virtual keyboards 8, 9) is set at a position in an overlapping manner, the control part 10 sets the latest selected tracking virtual keyboard which tracks the position of the hand of the user P by priority out of the plurality of these overlapping virtual operation panels. When this processing is finished, the control part 10 finishes this subroutine.

Figure 10A:
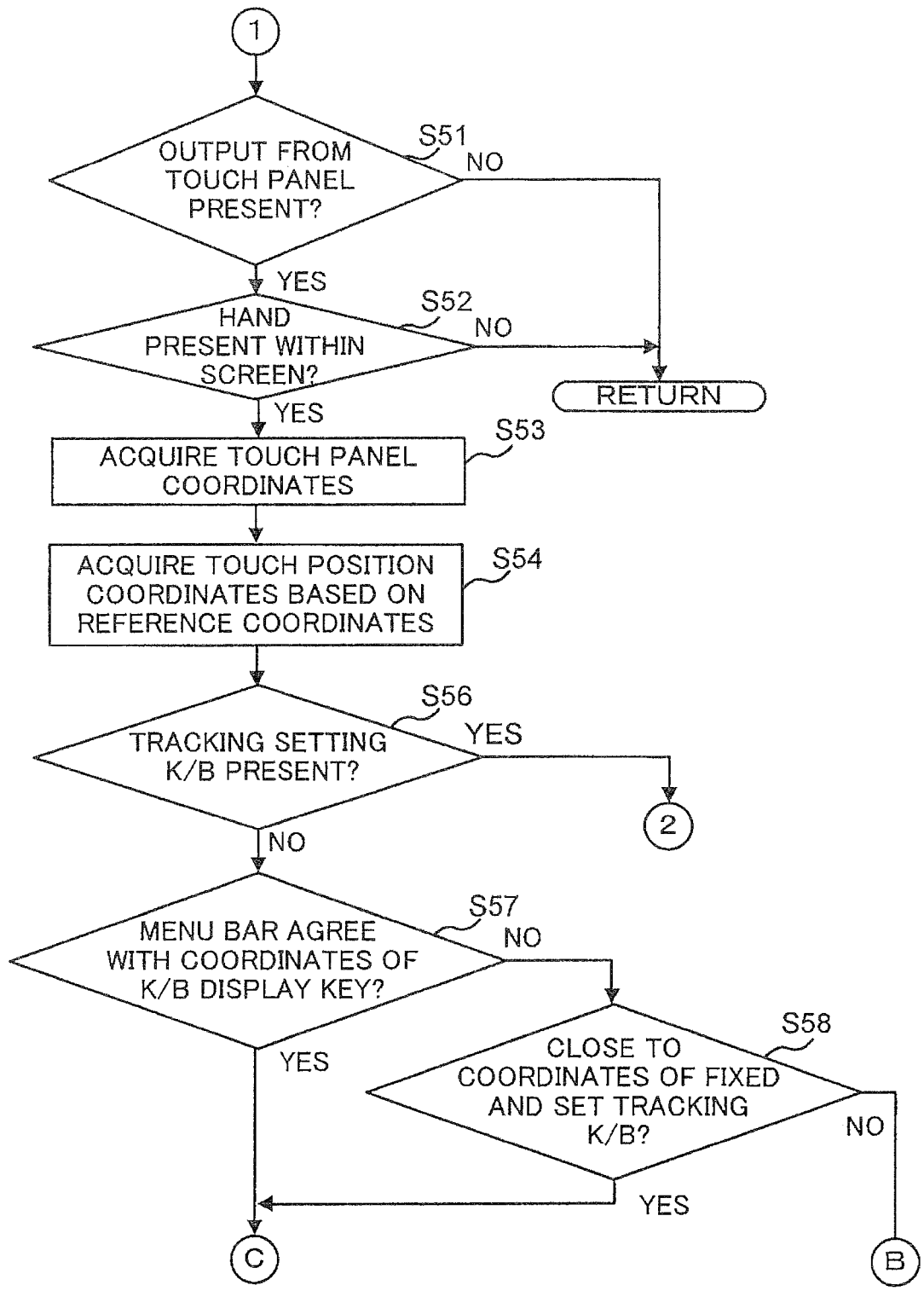
FIG. 10A is a flow chart showing one example of processing which is executed in performing the control of the HMD.

In step S51 in FIG. 10A, the control part 10 determines whether or not the contact position information on the finger of the user P detected by the touch panel 5 is outputted. In this processing, when a contact position different from the reference position of the hand of the user P where a state in which the hand of the user P is firstly brought into contact with the touch panel 5 is held is detected, the control part 10 determines that the contact position information on the finger of the user P detected by the touch panel 5 is outputted.

In determining the operation of the tracking virtual keyboard, when the touch panel 5 detects contact position coordinates at a first portion firstly, the control part 10 detects the contact position coordinates as the position of the thumb. Thereafter, when the touch panel 5 detects contact position coordinates at a second portion in a state where the first contact state is held, the control part 10 recognizes that a position corresponding to the contact position coordinates is operated. Note that the first and the second position are detected as a clump of contact position coordinates.

That is, the control part 10 determines whether or not the tracking virtual keyboard 8 is operated based on the position where the second specified portion (for example, an index finger or the like) different from the thumb of the hand of the user P (first specified portion) which becomes the reference position touches the touch panel 5.

When the control part 10 determines that the contact position information on the finger of the user P detected by the touch panel 5 is outputted (step S51: YES), the control part 10 advances the processing to step S52. On the other hand, when the control part 10 determines that the contact position information on the finger of the user P detected by the touch panel 5 is not outputted (step S51: NO), the control part 10 finishes this subroutine.

In step S52, the control part 10 detects the profile of the hand of the user P based on the result of the above-mentioned profile detection and color detection, and determines whether or not the hand of the user P is present within the display area 6 (screen). In this processing, when the control part 10 determines that the hand of the user P is present within the display area 6 (step S52: YES), the control part 10 advances the processing to step S53. On the other hand, when the control part 10 determines that the hand of the user P is not present within the display area 6 (step S52: NO), the control part 10 finishes this subroutine.

In step S53, the control part 10 acquires the contact position coordinates (contact position information) of the finger of the user P detected by the touch panel 5. Then, the control part 10 acquires the touch position coordinates based on the reference coordinates which constitutes the reference position of the hand of the user P (step S54). In this processing, the control part 10 acquires the touch position coordinates corresponding to the contact position coordinates in accordance with the positional relationship between the reference position of the hand of the user P and the acquired contact position coordinates. The touch position coordinates is coordinates in the display area 6 in the HMD body 2 and allows the user P to recognize the position where the operation is performed.

Next, the control part 10 determines whether or not the tracking virtual keyboard 8 set in a tracking mode is present within the display area 6 of the HMD body 2 (step S56). In this processing, when the control part 10 determines that the tracking virtual keyboard 8, set in a tracking mode, is present within the display area 6 of the HMD body 2 (step S56: YES), the control part 10 advances the processing to step S71 shown in FIG. 11. On the other hand, when the control part 10 determines that the tracking virtual keyboard 8, set in a tracking mode, is not present within the display area 6 of the HMD body 2 (step S56: NO), the control part 10 advances the processing to step S57.

In step S57, the control part 10 determines whether or not the contact position coordinates of the imaged finger of the user P agree with position coordinates of the K/B display key 7a of the virtual menu bar 7. In this processing, the control part 10 determines whether or not the virtual menu bar 7 is operated based on the contact position coordinates of the finger of the user P on the touch panel 5. The virtual menu bar 7 is a selection-use virtual operation panel for selecting the tracking virtual keyboard which is allowed to track the hand of the user P out of the plurality of tracking virtual keyboards 8. Each time the user P operates the KB display key 7a, the number of tracking virtual keyboards 8 is increased. On the other hand, the virtual menu bar 7 is used in a first operation for selecting a kind of the virtual operation panel. That is, a fine key operation is not applied to the virtual menu bar 7 and hence, the keys of the virtual menu bar 7 are sufficiently largely displayed compared to keys of the virtual operation panel. Accordingly, even when the virtual menu bar 7 is fixed within the display image, the operability of the virtual menu bar 7 is not spoiled. Further, the virtual menu bar 7 does not track the hand of the user P and hence, it is sufficient to simply detect whether or not the finger of the user P touches the touch panel 5.

In the processing in step S57, when the control part 10 determines that the contact position coordinates of the finger of the user P on the operated touch panel 5 agree with the position coordinates of the K/B display key 7*a* of the virtual menu bar 7 (step S57: YES), the control part 10 sets a focal length of the CCD camera 4 to a standard distance where the hand of the user P is present, and advances the processing to step S59. On the other hand, when the control part 10 determines that the contact position coordinates of the finger of the user P on the operated touch panel 5 do not agree with the position coordinate of the K/B display key 7*a* of the virtual menu bar 7 (step S57: NO), the control part 10 advances the processing to step S58.

In step S58, the control part 10 determines whether or not the position coordinate of the imaged hand of the user P is near the position coordinates of the tracking virtual keyboard 8 set in a fixed mode. That is, in a case where the position of the tracking virtual keyboard 8 is fixed, the control part 10 determines whether or not the position of the hand of the user P falls within a predetermined distance from the position of the tracking virtual keyboard 8 based on the result of the analysis of the image data outputted from the CCD camera 4. Here, when the position of the hand of the user P falls within the predetermined distance from the position of the tracking virtual keyboard 8, the control part 10 may define the position of the tracking virtual keyboard 8 as a display position of the tracking virtual keyboard 8 which tracks the position of the hand of the user P. By executing such processing, the tracking virtual keyboard which tracks the position of the hand of the user can be easily selected thus facilitating an operation of the HMD 1.

When the control part 10 determines that the coordinates of the imaged hand of the user P is near the position coordinate of the tracking virtual keyboard 8 set in a fixed mode (step S58: YES), the control part 10 sets a focal length of the CCD camera 4 to a standard distance where the hand of the user P is present, and advances the processing to step S59. On the other hand, when the control part 10 determines that the coordinates of the imaged hand of the user P is not near the position coordinate of the tracking virtual keyboard 8 set in a fixed mode (step S58: NO), the control part 10 finishes this subroutine.

In step S59, as shown in FIG. 10B, the control part 10 determines the position of the thumb of the hand of the user P as the reference coordinates based on the result of the analysis of the image data outputted from the CCD camera 4. The control part 10 acquires the determined reference coordinates (thumb position) of the user P (step S60).

In a case where the tracking virtual keyboard 8 which is set in a tracking mode is within the display area of the HMD body 2, when the three or more portions (three or more clumps) are detected by the touch panel 5, the control part 10 does not detect an operation conducted by the operated finger of the user P other than the thumb. On the other hand, when the two portions (two clumps) are detected by the touch panel 5, the control part 10 detects an operation conducted by the thumb and an operation conducted by the operated finger of the user P other than the thumb.

Next, the control part 10 acquires distances from the reference coordinates to respective fingers (step S61). The control part 10 also acquires distal-end coordinates of the respective fingers (step S62). Accordingly, the control part 10, based on the result of the analysis of the image data outputted from the CCD camera 4, detects a size of the hand of the user P.

Next, the control part 10 references the size table (see FIG. 6), and decides the size of the tracking virtual keyboard 8 based on the size of the hand of the user P. Further, the control part 10 executes display setting of the tracking virtual keyboard 8 which tracks the hand of the user P (step S63). The control part 10 sets the display of the tracking virtual keyboard 8 when the tracking virtual keyboard 8 is not displayed. On the other hand, the control part 10 sets the movement of the tracking virtual keyboard 8 when the tracking virtual keyboard 8 set in a fixed mode is displayed.

Then, the control part 10, as a result of the display setting, outputs a K/B display request to the control box 150 in the above-mentioned step S19. The K/B display request contains the size of the tracking virtual keyboard 8, position coordinates of the tracking virtual keyboard 8 corresponding to the position of the thumb of the user P and the like. Due to such outputting of the K/B display request, in the control box 150, image data for displaying the tracking virtual keyboard 8 is generated and is outputted to the controller 3.

That is, based on the size of the hand of the user P detected in step S62 and the size table stored in the flash ROM 16 the control part 10 selects a size of the tracking virtual keyboard 8 corresponding to the size of the hand of the user P.

The control part 10 may be configured to display the tracking virtual keyboard 8 which contains the previous page key 8*c* and the next page key 8*d* when the K/B display key 7*a* is operated one time. And, the control part 10 may be configured to display the tracking virtual keyboard 9 which contains a numerical keypad 9*e* when the K/B display key 7*a* is operated two times.

Further, the control part 10 displays the tracking virtual keyboard 8 set in a tracking mode at an uppermost layer thus detecting an operation by priority. That is, when a plurality of virtual operation panels (virtual menu bar 7 and tracking virtual keyboards 8, 9) is set at a position in an overlapping manner, the control part 10 sets the latest selected tracking virtual keyboard which tracks the position of the hand of the user P by priority out of the plurality of these overlapping virtual operation panels. When this processing is finished, the control part 10 finishes this subroutine.

Figure 11:
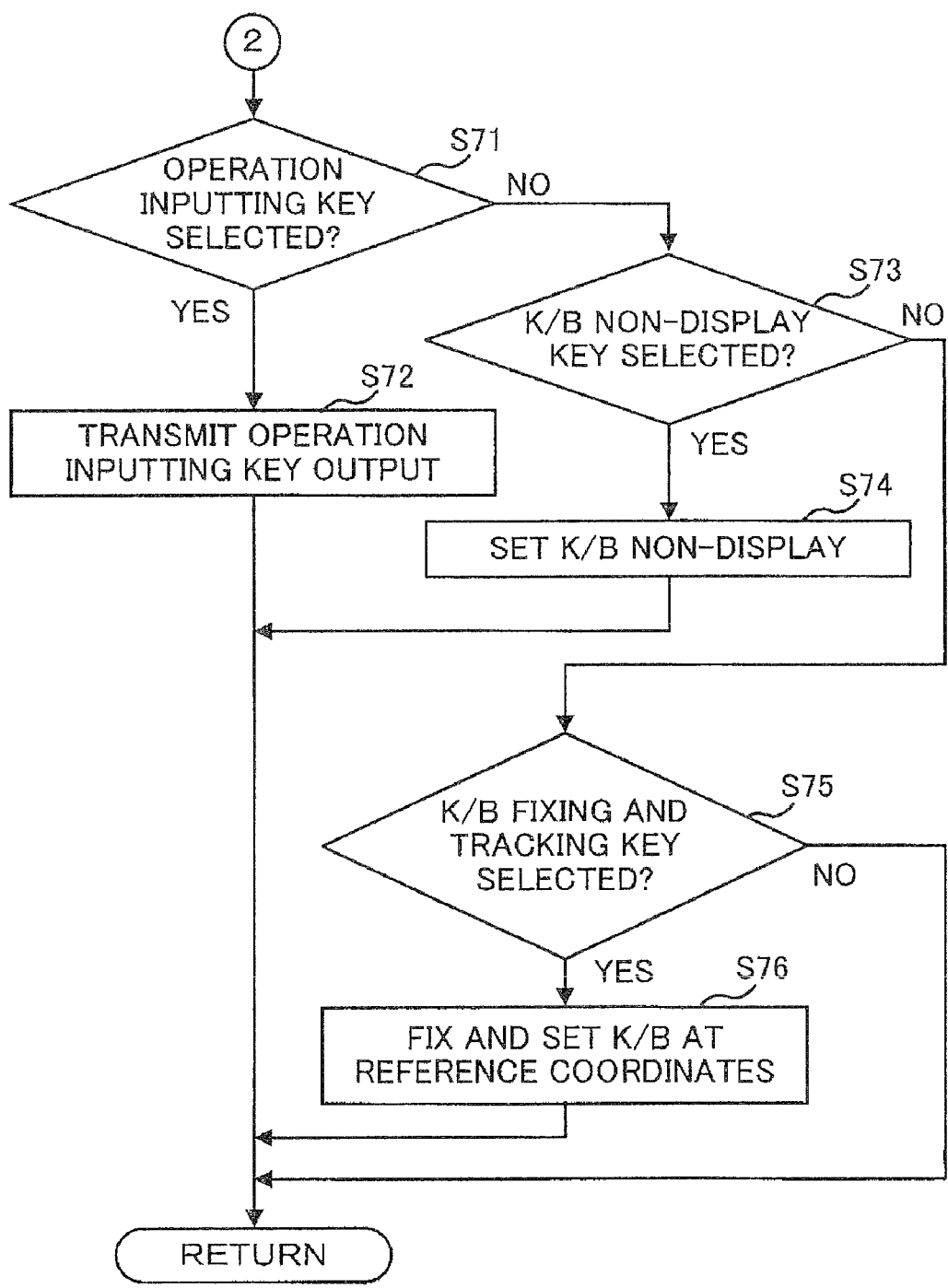
FIG. 11 is a flow chart showing one example of processing which is executed in performing the control of the HMD.

In step S71 shown in FIG. 11, the control part 10, based on the contact position coordinates of the finger of the user P detected by the operated touch panel 5, determines whether or not the operation inputting key (for example, previous page key 8*c*, next page key 8*d* or the like) of the tracking virtual keyboard 8 set in a tracking mode is selected.

In a case where the tracking virtual keyboard 8 set in a tracking mode is within the display area of the HMD body 2, when the three or more portions (three or more clumps) are detected by the touch panel 5, the control part 10 does not detect an operation conducted by the operated finger of the user P other than the thumb. On the other hand, when the two portions (two clumps) are detected by the touch panel 5, the control part 10 detects an operation conducted by the thumb and an operation conducted by the operated finger of the user P other than the thumb.

When the control part 10 determines that the operation inputting key is selected (step S71: YES), the control part 10 performs setting for outputting a signal generated by the operation inputting key to the control box 150 (step S72), and finishes this subroutine. On the other hand, when the control part 10 determines that the operation inputting key is not selected (step S71: NO), the control part 10 advances the processing to step S73.

In step S73, the control part 10, based on the contact position coordinates of the finger of the user P detected by the touch panel 5, determines whether or not the K/B non-display key 8b is selected out of the tracking virtual keyboards 8 which can track. When the control part 10 determines that the K/B non-display key 8b is selected (step S73: YES), the control part 10 performs setting for erasing the tracking virtual keyboard 8 having the selected K/B non-display key 8b (step S74).

The control part 10, as a result of erasing setting, outputs a K/B display erasing request to the control box 150 in the above-mentioned step S19. The K/B display erasing request contains information indicative of erasing of the display of the tracking virtual keyboard 8 and the like. Due to such outputting of the K/B display erasing request, in the control box 150, image data for erasing the display of the tracking virtual keyboard 8 is generated, and is outputted to the controller 3. When this processing is finished, the control part 10 finishes this subroutine.

On the other hand, when the control part 10 determines that the K/B non-display key 8b is not selected (step S73: NO), the control part 10 advances the processing to step S75.

In step S75, the control part 10, based on contact position coordinates of the finger of the user P detected by the touch panel 5, determines whether or not the K/B fixing/tracking key 8a is selected out of the tracking virtual keyboards 8 which can track. The control part 10, when it is determined that the K/B fixing/tracking key 8a is selected (step S75: YES), performs setting for fixing the tracking virtual keyboard 8 provided with the selected K/B fixing/tracking key 8a based on the current reference coordinates of the hand of the user P (step S76), and finishes this subroutine. On the other hand, the control part 10, when it is determined that the K/B fixing/tracking key 8a is not selected (step S75: NO), finishes this subroutine.

By allowing the tracking virtual keyboard 8 to move while tracking the hand of the user P in this manner, it is possible to prevent the displacement between the display position of the tracking virtual keyboard 8 and the operation position of the user P. Accordingly, the user P can stably and surely operate the HMD by freely moving his head or hand during the operation without being forced to fix his head or hand during the operation.

Further, the position of the tracking virtual keyboard 8 can be fixed without allowing the tracking virtual keyboard 8 to track the position of the hand of the user P in response to a predetermined operation conducted by the user P such as the operation of the K/B fixing/tracking key 8a. Accordingly, the unnecessary tracking virtual keyboard 8 can be fixed without allowing the tracking virtual keyboard 8 to track the hand of the user P and hence, it is possible to enhance the operability of the tracking virtual keyboard 8 thus facilitating the operability of the HMD 1.

Further, the control part 10 makes a decision for setting the display of the tracking virtual keyboard 8 valid or invalid in response to a predetermined operation conducted by the user P such as an operation of the K/B non-display key 8b. Here, the control part 10 allows a display of the tracking virtual keyboard 8 which is set valid, and does not allow the display of the tracking virtual keyboard 8 which is set invalid. By not displaying the tracking virtual keyboard 8 which becomes unnecessary, the visibility of the user P can be enhanced thus facilitating the operability of the HMD 1.

[Application]

The application executed in the control box 150 is explained in conjunction with FIG. 12 and FIG. 13.

Firstly, as shown in FIG. 12, the control part 160 of the control box 150 executes initial setting (step S101). In this processing, the control part 160 executes initial setting such as RAM access permission and initializing of a working area. When this processing is finished, the control part 160 advances processing to step S102.

In step S102, the control part 160 determines whether or not a signal is inputted to the control part 160 from the controller 3 through the communication I/F controller 170. In this processing, the control part 160 determines whether or not a signal such as a signal indicative of a request of an image or a signal indicative of an action is inputted to the control part 160 from the controller 3.

When the control part 160 determines that the signal is inputted to the control part 160 (step S102: YES), the control part 160 advances the processing to step S103. On the other hand, when the control part 160 determines that the signal is not inputted to the control part 160 (step S102: NO), the control part 160 executes the processing in step S102 again so that the control part 160 repeats the determination whether or not the signal is inputted to the control part 160.

In step S103, the control part 160 determines whether or not received signal inputting is a request for an image. In this processing, when the control part 160 determines that the received signal inputting is the request for an image (step S103: YES), the control part 160 advances the processing to step S104. On the other hand, when the control part 160 determines that the received signal inputting is not the request for an image (step S103: NO), the control part 160 advances the processing to step S105.

In step S104, the control part 160 generates request image data corresponding to the request for an image and sets the request image data in the RAM 168. When this processing is finished, the control part 160 advances the processing to step S113 shown in FIG. 13.

In step S105, the control part 160 determines whether or not received signal inputting is a request for a K/B display. In this processing, when the control part 160 determines that the received signal inputting is the request for a K/B display (step S105: YES), the control part 160 advances the processing to step S106. On the other hand, when the control part 160 determines that the received signal inputting is not the request for a K/B display (step S105: NO), the control part 160 advances the processing to step S107.

In step S106, the control part 160 defines a position where the tracking virtual keyboard 8 is displayed in the display area 6 of the HMD body 2 based on positional information contained in the request for a K/B display. Thereafter, the control part 160 generates image data for displaying the tracking virtual keyboard 8 at the defined position. The control part 160 sets the generated image data in the RAM 168. When this processing is finished, the control part 160 advances the processing to step S113 shown in FIG. 13.

In step S107, the control part 160 determines whether or not received signal inputting is a request for K/B display position movement. In this processing, when the control part 160 determines that the received signal inputting is the request for K/B display position movement (step S107: YES), the control part 160 advances the processing to step S108. On the other hand, when the control part 160 determines that the received signal inputting is not the request for KB display position movement (step S107: NO), the control part 160 advances the processing to step S109.

In step S108, the control part 160, based on positional information contained in the K/B display position movement request, defines a position in the display area 6 of the HMD body 2 where the moved tracking virtual keyboard 8 is displayed. Thereafter, the control part 160 generates image data for displaying the tracking virtual keyboard 8 at the defined position. The control part 160 sets the generated image data in the RAM 168. When this processing is finished, the control part 160 advances the processing to step S113 in FIG. 13.

In step S109, the control part 160 determines whether or not received signal inputting is a K/B display erasing request. In this processing, when the control part 160 determines that the received signal inputting is the K/B display erasing request (step S109: YES), the control part 160 advances the processing to step S110. On the other hand, when the control part 160 determines that the received signal inputting is not the K/B display erasing request (step S109: NO), the control part 160 advances the processing to step S111 in FIG. 13.

In step S110, the control part 160 generates image data without the tracking virtual keyboard 8 in the display area 6 of the HMD body 2 and sets the image data in the RAM 168. When this processing is finished, the control part 160 advances the processing to step S113 in FIG. 13.

In step S111 in FIG. 13, the control part 160 determines that received signal inputting is K/B operation information. Then, the control part 160 generates image data having content corresponding to the KB operation information. The control part 160 stores the generated image data in the RAM 168. For example, when the K/B operation information is operation information on the next page key 8d, the control part 160 generates the image data of the next page of the currently displaying content image. On the other hand, when the K/B operation information is operation information on the previous page key 8c, the control part 160 generates the image data of the previous page of the currently displaying content image. When this processing is finished, the control part 160 advances the processing to step S112.

In step S112, the control part 160 outputs the image data generated in the above-mentioned manner and set in the RAM 168 to the controller 3 through the communication I/F controller 170. When this processing is finished, the control part 160 advances the processing to step S113.

In step S113, the control part 160 determines whether or not the application is finished corresponding to the various operations or the like. When the control part 160 determines that the application is finished (step S113: YES), the control part 160 finishes the application. On the other hand, when the control part 160 determines that the application is not finished (step S113: NO), the control part 160 returns the processing to step S102. Due to such processing, the control part 160 executes the processing in step S101 to step S112 until the application is finished.

In this manner, the control part 160 in the control box 150 generates the image data corresponding to the signal from the controller 3 and outputs the image data to the controller 3 thus controlling the image to be displayed in the display area 6 of the HMD body 2.

[Other Variations]

In the above-mentioned embodiment, the explanation has been made with respect to a case where the control part 10 performs tracking movement of the tracking virtual keyboard 8 based on the result of analysis of the imaged image irrespective of the touch panel 5. However, the present invention is not limited to such a case. For example, the control part 10 may perform the tracking movement of the tracking virtual keyboard 8 by moving the tracking virtual keyboard 8 in a state where the reference position (for example, the thumb or the like) of the hand of the user P touches the touch panel 5.

In this case, a portion of the hand of the user P is set as the reference position and hence, when the hand of the user P is moved in a state where the reference position touches the touch panel 5, the control part 10 allows the tracking virtual keyboard 8 to move while tracking the reference position of the hand of the user P. Further, the control part 10 may allow the tracking virtual keyboard 8 to move while tracking the reference position of the hand of the user P even in a case where the reference position is once separated from the touch panel 5 and touches the touch panel 5 again.

Further, in the above-mentioned embodiment, the control part 10 detects the hand of the user P based on a result of the analysis of an imaged image or a contact signal from the touch panel 5, and when the thumb of the user P touches the touch panel 5, the control part 10 defines such a contact portion as the reference position for tracking. However, the present invention is not limited to such a reference position definition control. For example, the control part 10 may detect the hand of the user P based on only the result of analysis of the imaged image irrespective of the reception of a contact signal from the touch panel 5. Further, for example, the control part 10 may define the reference position for tracking based on only the result of analysis of the imaged image irrespective of the reception of a contact signal from the touch panel 5. In this case, without indicating the reference position by the thumb of the user P or the like on the touch panel 5, the control part 10 detects a profile or color of the hand of the user P, and moves the tracking virtual keyboard 8 such that the tracking virtual keyboard 8 tracks the hand of the user P.

In the above-mentioned embodiment, when the hand of the user P falls within an imaging range of the CCD camera 4, the control part 10 displays the tracking virtual keyboard 8 set in a tracking mode. On the other hand, when the hand of the user P is out of the imaging range, the control part 10 does not display the tracking virtual keyboard 8 set in a tracking mode. However, the display control of the present invention is not limited to such a display control. For example, even when the hand of the user P projects from the imaging range, the control part 10 may display the tracking virtual keyboard 8 set in a tracking mode for a predetermined time (for example, 1 minute) or until the KB non-display key 8b is operated. Further, the control part 10 may not display the tracking virtual keyboard 8 unless a predetermined time elapses even when the hand of the user P falls within the imaging range of the CCD camera 4 from the outside of such an imaging range.

Further, when a distance from the tracking virtual keyboard 8 set in a fixing mode to the hand of the user P is counted and a result of counting is within a predetermined range, the control part 10 changes setting of the tracking virtual keyboard 8 from a fixing mode to a tracking mode. However, the setting change of the tracking virtual keyboard 8 of the present invention is not limited to the above-mentioned setting change. For example, the control part 10 may change setting of the tracking virtual keyboard 8 from a fixing mode to a tracking mode in response to a selection operation in the vicinity of the K/B fixing/tracking key 8a. That is, the control part 10, based on the operation conducted is executed by the finger which is detected by the touch panel 5, determines whether or not an operation which allows the position of the tracking virtual keyboard 8 to track the position of the hand of the user P.

Further, in the above-mentioned embodiment, the control part 10 perform a display control such that the virtual menu bar 7 for selecting the tracking virtual keyboard 8 is displayed in the display area 6. However, the display control of the present invention is not limited to such a display control. For example, the virtual menu bar 7 may not be displayed in the display area 6, instead a physical operation part may be additionally provided for displaying and selecting the tracking virtual keyboard 8.

In the above-mentioned embodiment, the plural kinds of tracking virtual keyboards 8 are made displayable in the display area 6 simultaneously. However, the present invention is not limited to such a display control. For example, only one kind of tracking virtual keyboard may be displayable.

In the above-mentioned embodiment, the control part 10 measures the distances to the respective finger tips using the position of the thumb of the hand of the user P as the reference coordinates, and recognizes the size of the hand of the user P based on the result of the measurement. However, the recognition control of the present invention is not limited to such a recognition control. For example, the control part 10 may measure a distance to a certain finger (a middle finger or a little finger) out of respective fingers of the user P, and may recognize the size of the hand of the user P based on a result of the measurement. Further, the control part 10 may measure distances to respective fingers of the user P using a certain position of the hand of the user P such as a wrist as the reference coordinates, and may recognize the size of the hand of the user P based on a result of the measurement.

Further, in the above-mentioned embodiments, the control part 10 decides the size of the tracking virtual keyboard 8 based on the size of the hand of the user P and the size table. However, the size decision control of the present invention is not limited to such a size decision control. For example, the control part 10 may induce a size of the tracking virtual keyboard 8 by computation corresponding to a size of the hand of the user P. Further, an aspect ratio of the tracking virtual keyboard 8 may be fixed or may be changeable corresponding to setting. A size of the tracking virtual keyboard 8 may not be changeable.

In the above-mentioned embodiment, the HMD body 2, the controller 3 and the control box 150 are formed as separate bodies respectively. However, the present invention is not limited to such a constitution. For example, the controller 3 and the control box 150 may be integrally formed or the HMD body 2 and the controller 3 may be integrally formed.

All of these parts may be integrally formed or may be formed as separate bodies.

Although several embodiments of the present invention have been explained in detail in conjunction with the drawings heretofore, these embodiments merely constitute examples, and the present invention can be carried out in other modes to which various modifications and improvement are applied based on knowledge of those who are skilled in the art.

What is claimed is:

1. A head mount display comprising:
    a display unit which is configured to transmit an ambient light therethrough, and is configured to project an image light corresponding to image data onto an eye of a user in order to allow the user to observe an image corresponding to the image light;
    an imaging unit which is configured to image at least a portion of a field of view of the user;
    an image analyzing unit which is configured to analyze an image imaged by the imaging unit;
    a hand detection unit which is configured to detect a hand of the user based on a result of an analysis performed by the image analyzing unit;
    a touch panel which is configured to detect a contact of the hand of the user therewith;
    a position definition unit which is configured to define a display position to display a selected virtual operation panel which is selected by the user from a plurality of virtual operation panels such that the selected virtual operation panel moves on the screen coextensively with movement of the hand of the user which is observed by the user through the display unit;
    a display control unit which is configured to control the display unit such that the display unit displays the selected virtual operation panel at the display position;
    an operation determination unit which is configured to determine whether or not the selected virtual operation panel is operated based on a touch position of a finger of the user detected by the touch panel; and
    an operation control unit which is configured to perform a control corresponding to an operation position on the selected virtual operation panel when the operation determination unit determines that the selected virtual operation panel is operated, and
    wherein the position definition unit defines a first specified portion of the hand of the user as a reference position based on a position of the hand of the user detected by the hand detection unit, and the position definition unit defines the display position for the selected virtual operation panel which always assumes a predetermined positional relationship with the reference position and the display position in a display area displayed by the display unit, and the position definition unit fixes another display position of each of other virtual operation panels which are not selected by the user from the plurality of virtual operation panels without allowing the other virtual operation panels to move on the screen coextensively with movement of the position of the hand of the user.

2. The head mount display according to claim 1, wherein the operation determination unit determines whether or not the selected virtual operation panel is operated based on a position where a second specified portion different from the first specified portion touches the touch panel.

3. The head mount display according to claim 1, wherein the hand detection unit is further configured to detect a size of the hand of the user,
    wherein the head mount display further comprises a size selection unit which is configured to select a size of the selected virtual operation panel based on the size of the hand of the user detected by the hand detection unit, and
    wherein the position definition unit is configured to define the display position of the selected virtual operation panel based on the size of the selected virtual operation panel selected by the size selection unit.

4. The head mount display according to claim 3, wherein the head mount display further comprises a size memory unit in which size information where the size of the hand of the user and the size of the selected virtual operation panel corresponding to the size of the hand of the user are associated with each other is stored, and
    the size selection unit is configured to select the size of the selected virtual operation panel based on the size of the hand of the user detected by the hand detection unit and the size information stored in the size memory unit.

5. The head mount display according to claim 1, wherein the head mount display includes a position setting unit which is configured to set a selection-use virtual operation panel at a predetermined display position, and the selection-use virtual operation panel is to select the selected virtual operation panel for moving on the screen coextensively with movement of the hand of the user from the plurality of virtual operation panels, and
    the display control unit controls the display unit to display the selection-use virtual operation panel.

6. The head mount display according to claim 5, wherein the position definition unit defines the display position of the selected virtual operation panel which is selected for moving on the screen coextensively with movement of the position of the hand of the user latest out of a plurality of overlapping virtual operation panels when the plurality of virtual operation panels is set at a position in an overlapping manner.

* * * * *